US012231851B1

(12) United States Patent
Lovchinsky et al.

(10) Patent No.: US 12,231,851 B1
(45) Date of Patent: Feb. 18, 2025

(54) METHOD, APPARATUS AND SYSTEM FOR LOW LATENCY AUDIO ENHANCEMENT

(71) Applicant: Chromatic Inc., New York, NY (US)

(72) Inventors: Igor Lovchinsky, New York, NY (US); Jonathan Macoskey, Pittsburgh, PA (US); Philip Meyers, IV, Brooklyn, NY (US); Andrew J. Casper, Inver Grove Heights, MN (US); Nicholas Morris, Brooklyn, NY (US)

(73) Assignee: Chromatic Inc., New York, NY (US)

( * ) Notice: Subject to any disclaimer, the term of this patent is extended or adjusted under 35 U.S.C. 154(b) by 147 days.

(21) Appl. No.: 18/100,513

(22) Filed: Jan. 23, 2023

Related U.S. Application Data

(60) Provisional application No. 63/302,462, filed on Jan. 24, 2022, provisional application No. 63/302,531, filed on Jan. 24, 2022.

(51) Int. Cl.
*H04R 25/00* (2006.01)

(52) U.S. Cl.
CPC ......... *H04R 25/507* (2013.01); *H04R 25/554* (2013.01); *H04R 2225/43* (2013.01)

(58) Field of Classification Search
CPC H04R 25/505; H04R 25/507; H04R 2225/43; G10L 25/30
See application file for complete search history.

(56) References Cited

U.S. PATENT DOCUMENTS 9,881,631 B2 1/2018 Erdogan et al.
10,721,571 B2 7/2020 Crow et al.
10,812,915 B2 10/2020 Santos et al.
10,957,301 B2 3/2021 Hoby et al.
(Continued)

FOREIGN PATENT DOCUMENTS

EP 0 357 212 A2 3/1990
WO WO 2022/079848 A1 4/2022
(Continued)

OTHER PUBLICATIONS

Giri et al., Personalized Percepnet: Real-time, Low-complexity Target Voice Separation and Enhancement. Amazon Web Service, Jun. 8, 2021, arXiv preprint arXiv:2106.04129. 5 pages.

*Primary Examiner* — Ryan Robinson
(74) *Attorney, Agent, or Firm* — Wolf, Greenfield & Sacks, P.C.

(57) ABSTRACT

According to some embodiments, an ear-worn device, e.g., a hearing aid, is provided that operates to enhance audio signals detected by the ear-worn device. In some embodiments, the ear-worn device includes a microphone, a processing circuit coupled to the microphone, and an output signal generator coupled to the processing circuit. In some embodiments, a method for enhancing audio signals includes: detecting an audio signal with the microphone; as the audio signal is being detected, dividing the audio signal into a plurality of segments; enhancing the detected audio signal with the processing circuit of the hearing aid; and outputting the enhanced audio signal with the output signal generator. In some embodiments, enhancing the detected audio signal includes processing one or more of the segments of the detected audio signal with a neural network engine (NNE) of the processing circuit to obtain an output for enhancing the detected audio signal.

18 Claims, 15 Drawing Sheets

(56) References Cited

U.S. PATENT DOCUMENTS

| | | | | |
|---|---|---|---|---|
| 11,330,378 | B1 | 5/2022 | Jelcicová et al. | |
| 11,373,672 | B2 * | 6/2022 | Mesgarani | G10L 25/30 |
| 11,375,325 | B2 | 6/2022 | Froehlich et al. | |
| 11,647,344 | B2 * | 5/2023 | Chen | H04R 25/507 381/317 |
| 11,800,301 | B2 * | 10/2023 | Verhulst | G06N 3/084 |
| 11,804,234 | B2 * | 10/2023 | Gallart Mauri | G06N 3/04 |
| 12,003,920 | B2 * | 6/2024 | Jensen | H04R 25/507 |
| 2016/0099008 | A1 * | 4/2016 | Barker | H04R 25/505 704/233 |
| 2021/0289299 | A1 | 9/2021 | Durrieu | |
| 2022/0095061 | A1 | 3/2022 | Diehl et al. | |
| 2022/0159403 | A1 | 5/2022 | Sporer et al. | |
| 2022/0223161 | A1 | 7/2022 | Fuchs et al. | |
| 2022/0230048 | A1 | 7/2022 | Li et al. | |
| 2022/0232321 | A1 | 7/2022 | Wexler et al. | |
| 2022/0232331 | A1 | 7/2022 | Jelcicová et al. | |
| 2022/0256294 | A1 | 8/2022 | Diehl et al. | |
| 2023/0169987 | A1 * | 6/2023 | Jin | H04R 1/1083 704/200 |
| 2024/0223971 | A1 * | 7/2024 | Pedersen | H04R 25/50 |

FOREIGN PATENT DOCUMENTS

| | | | |
|---|---|---|---|
| WO | WO 2022/107393 | A1 | 5/2022 |
| WO | WO 2022/191879 | A1 | 9/2022 |

* cited by examiner

METHOD, APPARATUS AND SYSTEM FOR LOW LATENCY AUDIO ENHANCEMENT

CROSS-REFERENCE TO RELATED APPLICATIONS

This application claims the benefit under 35 U.S.C. § 119 (e) of U.S. Provisional Patent Application Ser. No. 63/302,462, filed Jan. 24, 2022, entitled "METHOD, APPARATUS AND SYSTEM FOR LOW LATENCY AUDIO ENHANCEMENT," which is herein incorporated by reference in its entirety.

This application claims the benefit under 35 U.S.C. § 119 (e) of U.S. Provisional Patent Application Ser. No. 63/302,531, filed Jan. 24, 2022, entitled "METHOD, APPARATUS AND SYSTEM FOR LOW LATENCY AUDIO ENHANCEMENT," which is herein incorporated by reference in its entirety.

BACKGROUND

The present application relates to ear-worn speech enhancement devices, such as hearing aids. Hearing aids are used to help those who have trouble hearing to hear better. Typically, hearing aids amplify received sound. Some hearing aids attempt to remove environmental noise from incoming sound.

SUMMARY

Some embodiments provide for a method for enhancing an incoming audio signal with an ear-worn device. The ear-worn device comprises a microphone, a processing circuit coupled to the microphone, and an output signal generator coupled to the processing circuit. The method comprises: detecting an audio signal with the microphone of the ear-worn device; as the audio signal is being detected, dividing, with the processing circuit of the ear-worn device, the audio signal into a plurality of overlapping segments, the plurality of overlapping segments comprising a first segment and a second segment, the first segment and the second segment sharing an overlapping portion; after detecting the first segment, enhancing the overlapping portion by processing the first segment with a neural network engine (NNE) of the processing circuit to obtain a first output for enhancing the first segment including the overlapping portion; transmitting the enhanced overlapping portion to the output signal generator for playback; beginning playback of the enhanced overlapping portion with the output signal generator; detecting the second segment during the playback of the enhanced overlapping portion; after detecting the second segment including the overlapping portion and a non-overlapping portion, enhancing the non-overlapping portion of the second segment by processing the second segment with the NNE to obtain a second output for enhancing the second segment including the overlapping portion and the non-overlapping portion; transmitting the enhanced non-overlapping portion to the output signal generator for playback; and beginning playback of the enhanced non-overlapping portion with the output signal generator.

Some embodiments provide for a method for enhancing an incoming audio signal with an ear-worn device. The ear-worn device comprises: a microphone, a processing circuit coupled to the microphone, and an output signal generator coupled to the processing circuit. The method comprises: detecting an audio signal with the microphone of the ear-worn device; as the audio signal is being detected, dividing, with the processing circuit of the hearing aid, the audio signal into a plurality of segments, the plurality of segments comprising a first segment and a second segment, the first segment preceding the second segment in time; after detecting the first segment, processing the first segment with a neural network engine (NNE) to obtain a first output for enhancing the second segment; enhancing the second segment based on the first output of the NNE; transmitting the enhanced second segment to an output signal generator for playback; and beginning playback of the enhanced second segment with the output signal generator.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
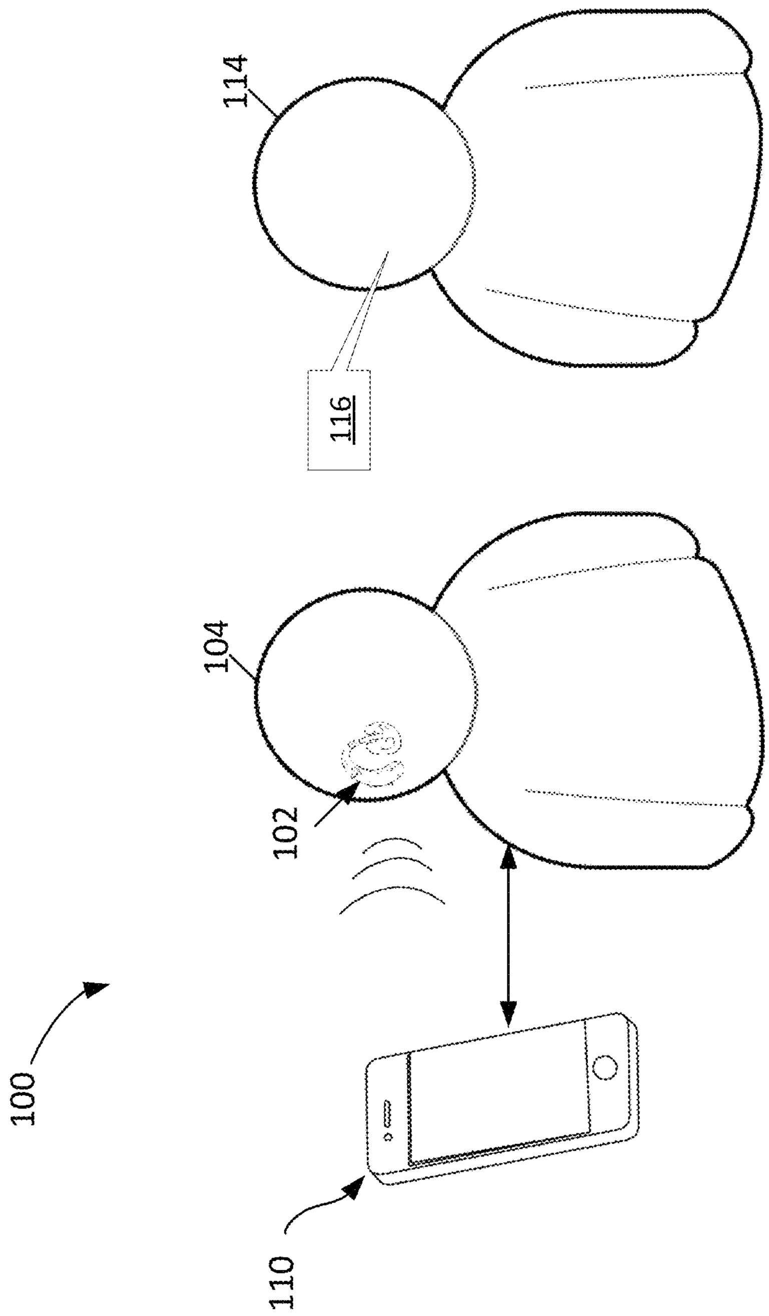
FIG. 1 illustrates an example listening environment and an audio system including an ear-worn device and a separate electronic device, according to a non-limiting embodiment of the present application.

According to some embodiments of the present technology, an ear-worn device, e.g., a hearing aid, is provided that operates to enhance audio signals detected by the ear-worn device. The ear-worn device includes, in some embodiments, a microphone, a processing circuit coupled to the microphone, and an output signal generator coupled to the processing circuit. In some embodiments, the ear-worn device operates to detect an audio signal with the microphone, divide the detected audio signals into a plurality of segments, enhance the detected audio signal with the processing circuit by processing one or more of the plurality of segments with a neural network engine (NNE), and output the enhanced audio signal with the output signal generator. In some embodiments, enhancing the audio signal includes processing the segments of the audio signal in a manner that reduces the amount of time between detecting the audio signal with the microphone of the ear-worn device and outputting the enhanced audio signal with the output signal generator of the ear-worn device.

Audio enhancement techniques are used in videoconferencing and other telecommunication mediums to improve the quality of audio output. For example, a telecommunication platform may process audio using a neural network-based algorithm to reduce background noise, making it easier for the user to hear target sounds, such as the speech of another user of the telecommunication platform.

Deploying audio enhancement techniques introduces delays between when a sound is emitted by the sound source and when the enhanced sound is output to a user. For example, such techniques may introduce a delay between when a speaker speaks and when a listener hears the enhanced speech. This is due to latencies incurred by processing an audio signal with such audio enhancement techniques. As used herein, "latency" refers to the amount of time it takes for a signal to pass through a system. For example, the latency associated with processing an audio signal with an ear-worn device may refer to the amount of time it takes for a processing circuit of the ear-worn device to receive an audio signal, process the audio signal to generate a processed signal, and output the processed signal.

The inventors have recognized that the tolerable latency for in-person communication (e.g., when a speaker and a listener are co-located) is lower than the tolerable latency for remote communication (e.g., when the speaker and listener are not co-located). During in-person communication, long latencies can create the perception of an echo as both the original sound and the enhanced version of the sound are played back to the listener. Additionally, long latencies can interfere with how the listener processes incoming sound due to the disconnect between visual cues (e.g., moving lips) and the arrival of the associated sound.

The inventors have further recognized that conventional approaches to neural network-based audio enhancement techniques are associated with high latencies because they use sequential processing. Sequential processing can be characterized by processing a segment of audio using a sequence of processing steps, each of which incurs latency and cannot begin until the previous step has completed. One exemplary process includes, starting at an initial time, (1) receiving a segment of an audio signal having a particular length; (2) providing that segment of audio data to a neural network, which processes it and generates a mask; (3) applying the mask or other enhancement to the original audio signal to generate an enhanced audio signal; and (4) playing back the enhanced audio signal. The difference between the initial time and audio playback is the total latency of the exemplary process.

The above-described process happens every x milliseconds, where x is the "step" of the model. The step can be equal to or shorter than the segment size. If the step is shorter than the segment size, then the end portion of a preceding segment will overlap a beginning portion of a current segment. Therefore, the audio in the overlapping portion will have already been analyzed by processing the preceding segment. In this case, the model has multiple "votes" as to how audio in the overlapping portion should sound. The typical technique is to average the available votes. Changing the step size does not change the model latency, which, as outlined above, is determined by the sum of the segment length, the time for processing the segment with the neural network, and the time for applying the mask or other enhancement to the original audio signal. For example, consider a technique that uses a segment length of 16 milliseconds and a step size of 8 milliseconds. The segments will overlap one another by 8 milliseconds. Therefore, the 8 milliseconds of audio in the overlapping portion will be processed twice, resulting in two votes as to how that 8 milliseconds of audio will sound.

One technique that may be employed to reduce latency is to reduce the length of the segment of the audio signal that is being enhanced. As described above, receiving the segment of the audio signal incurs latency. For example, receiving a 10-millisecond segment of an audio signal incurs a 10-millisecond latency. By reducing the length of the audio segment, the latency is necessarily lowered. For example, reducing the length of the segment to 5 milliseconds would also lower the corresponding latency to 5 milliseconds. However, such changes reduce the performance of the neural network engine (NNE) used to enhance the audio signal because they reduce the amount of information provided to the NNE for each inference call. Accordingly, reducing segment length cannot be used to reduce latency without also reducing the overall performance of the audio enhancement techniques.

Because conventional neural network-based audio enhancement techniques have relatively high latency, they have limited applicability. While such latencies may be tolerable for remote communication (e.g., telecommunication), they are not tolerable for in-person communication. Accordingly, such techniques may not be suitable for implementation on in-person communication devices, such as ear-worn devices (e.g., hearing aids). An acceptable latency for such devices is under 10 milliseconds, though wearers can often hear the difference between a few milliseconds. Thus, latencies closer to zero may be desirable.

However, the inventors have further recognized that it may be beneficial for ear-worn devices, such as hearing aids, to employ neural network-based audio enhancement techniques to improve an aspect of an audio signal output to a wearer. Wearers of ear-worn devices typically have hearing deficiencies. While conventional ear-worn devices may be used to amplify sound, they may not be configured to distinguish between target sounds and non-target sounds and/or selectively process components of detected audio. Applying neural network-based audio enhancement techniques may be employed to address such deficiencies of conventional ear-worn device technology.

Accordingly, the inventors have developed methods and apparatus that address the above-described challenges of conventional neural network-based audio enhancement techniques and hearing aid technology. In some embodiments, an ear-worn device is provided that is operable to enhance audio signals detected by the ear-worn device. For example, the ear-worn device may include a hearing aid. In some embodiments, the ear-worn device includes a microphone, a processing circuit coupled to the microphone, and an output signal generator (e.g., a speaker). For example, the processing circuit may include a neural network engine (NNE) and/or a digital signal processing (DSP) circuit. In some embodiments, the ear-worn device is configured to perform methods of enhancing audio signals by processing segments of a detected audio signal with the NNE. As described herein, the latency associated with such methods for enhancing audio signals is lower than that of conventional neural network-based audio enhancement techniques which rely on sequential processing and other, similar techniques. Accordingly, the techniques developed by the inventors are applicable to and suitable for in-person communication environments.

In a first embodiment of the technology described herein, a method of enhancing audio signals with an ear-worn device includes: (a) detecting an audio signal with the microphone of the ear-worn device; (b) as the audio signal is being detected, dividing the audio signal into a plurality of overlapping segments including a first segment and a second segment, where the first and second segments overlap one another and share an overlapping portion; (c) after detecting the first segment of the audio signal, enhancing the overlapping portion with the processing circuit of the ear-worn device; (d) transmitting the enhanced overlapping portion to an output signal generator for playback; (c) detecting the second segment during playback of the enhanced overlapping portion by the output signal generator; (f) after detecting the second segment, enhancing a non-overlapping portion of the second segment with the processing circuit; and (g) transmitting the enhanced non-overlapping portion to the output signal generator for playback. In some embodiments, enhancing the overlapping portion includes processing the first segment with a neural network engine (NNE) to obtain a first output for enhancing the first segment including the overlapping portion. In some embodiments, enhancing the non-overlapping portion of the second segment includes processing the second segment, including both the overlapping portion and the non-overlapping portion, with the NNE to obtain a second output for enhancing the second segment.

By enhancing and beginning playback of the overlapping portion as soon as the detection and processing of the first segment is complete, the techniques described herein reduce the latency incurred by waiting to completely detect and process the second segment with the NNE before enhancing and outputting the overlapping portion. Furthermore, by processing the entire second segment (e.g., including the overlapping portion), rather than just the non-overlapping portion, to estimate how the non-overlapping portion of the second segment should be enhanced, the NNE accounts more information, enabling a more accurate prediction for how the non-overlapping portion of the second segment should be enhanced.

In a second embodiment of the technology described herein, a method of enhancing audio signals with an ear-worn device includes: (a) detecting an audio signal with the microphone of the ear-worn device; (b) dividing the detected audio signal into a plurality of segments; (c) enhancing the detected audio signal with the processing circuit of the ear-worn device; and (d) outputting the enhanced audio signal with the output signal generator of the ear-worn device. In some embodiments, dividing the detected audio signal into segments includes dividing the audio signal into a first segment and a second segment. In some embodiments, enhancing the detected audio signal includes: (a) processing the first segment with the NNE of the processing circuit to obtain a first output for enhancing the detected audio signal; (b) processing the second segment with the NNE of the processing circuit to obtain a second output for enhancing the detected audio signal; and (c) enhancing the second segment based on the first output of the NNE. In some embodiments, the enhancing of the second segment is performed prior to completing the processing of the second segment with the NNE. For example, processing the second segment with the NNE may be performed in parallel with enhancing the second segment. In some embodiments, the enhanced second segment is transmitted to the output signal generator prior to completing the processing of the second segment. By utilizing the results of processing the first segment of the detected audio signal to enhance the second segment of the detected audio signal, the techniques described herein eliminate the latency incurred by waiting to complete the processing of the second segment.

The aspects and embodiments described above, as well as additional aspects and embodiments, are described further below. These aspects and/or embodiments may be used individually, all together, or in any combination of two or more, as the disclosure is not limited in this respect.

FIG. 1 illustrates an example listening environment and an audio system including an ear-worn device 102 and a separate electronic device 110. In this example, the ear-worn device 102 is a hearing aid and the electronic device 110 is a smartphone.

In some embodiments, the ear-worn device 102 detects a sound and outputs an audio signal to the ear-worn device wearer 104. For example, the ear-worn device wearer may be hard of hearing, and the ear-worn device 102 may be a hearing aid. As described herein, the ear-worn device may enhance the sound using a processing circuit of the ear-worn device. The ear-worn device may enhance the sound by isolating component(s) of the sound attributable to particular sound source(s), remove background noise, adjust a signal-to-noise ratio (SNR) of the sound, amplify component(s) the sounds, and/or process the sound according to any other suitable audio enhancement techniques, as aspects of the technology are not limited in this respect. For example, the ear-worn device may enhance an audio signal by isolating speech 116 of speaker 114 from background noise.

In some embodiments, the ear-worn device is configured to enhance audio signals according to the techniques described herein. Such techniques have latencies that are suitable for in-person communication environments, such as that shown in FIG. 1. For example, the techniques described herein for enhancing audio signals may have latencies of less than 10 milliseconds. Example low-latency techniques for enhancing audio signals are described herein including at least with respect to FIGS. 5-8C.

In some embodiments, the ear-worn device 102 communicates with electronic device 110. The wearer 104 may interact with the electronic device 110 to control one or more features of the ear-worn device. As a nonlimiting example, the user may interact with the electronic device to adjust a volume of an output audio signal and/or select target speaker(s) thereby configuring the ear-worn device to isolate components of detected audio signals attributable to the selected target speaker(s). Additionally, or alternatively, the user may interact with the electronic device to adjust volume, signal-to-noise ratio, and/or any other suitable feature of the ear-worn device, as aspects of the technology described herein are not limited in this respect.

Figure 2:
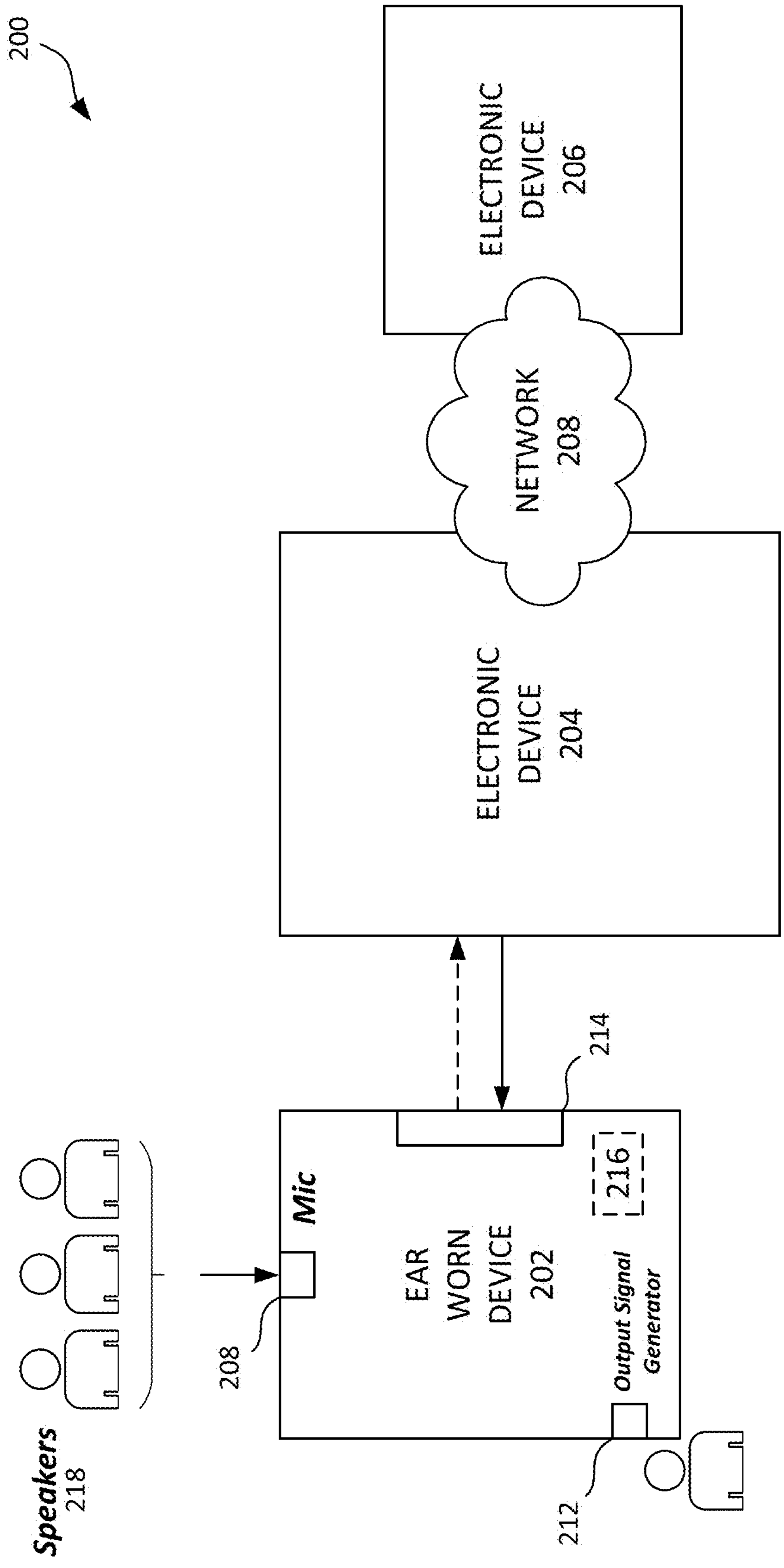
FIG. 2 illustrates a system with an ear-worn device and a portable electronic device in communication with the ear-worn device, according to a non-limiting embodiment of the present application.

FIG. 2 illustrates a system with an ear-worn device and a portable electronic device in communication with the ear-worn device, according to a non-limiting embodiment of the present application. Audio system 200 may be an example implementation of the system shown in FIG. 1. For example, audio system 200 may include an ear-worn device 202 and electronic device 204. Audio system 200 may additionally, or alternatively, include electronic device 206 communicatively coupled with electronic device 204 via network 208. It should be appreciated that audio system 200 may include one or more additional, or alternative components, as aspects of the technology described herein are not limited in this respect.

The ear-worn device 202 may be an example implementation of the ear-worn device 102 of FIG. 1. Ear-worn device 202 as described in FIG. 2 may have various forms. For example, the ear-worn device may be a hearing aid, a headphone, face-worn smart glasses, an augment reality headset, or any suitable audio device. Additionally, ear-worn device 202 may include a communication port 214 configured to communicate (e.g., wired or wirelessly) with an external device and exchange data with an external device, such as electronic device 204. Electronic device 204 may be an example implementation of the electronic device 110 of FIG. 1. For example, electronic device 204 may be a smart phone, or any suitable portable electronic device associated with the wearer of the ear-worn device.

In some non-limiting examples, ear-worn device 202 may include a microphone 208 and a speaker device (e.g., an output signal generator) 212. Microphone 208 may be configured to detect audio signal from sound (e.g., speech). For example, the audio signal may include speech components from one or more speakers 218. Speaker device 212 may be configured to output an output audio signal. For example, the output audio signal may include an enhanced version of the audio signal detected by microphone 208. Ear-worn device 204 may be configured to enhance the detected audio signal according to the low-latency techniques described herein, including at least with respect to FIGS. 5-8C.

Electronic device 206 may be used to adjust one or more aspects of the ear-worn device 202, access data stored on electronic device 204, and/or otherwise interact with electronic device 204. For example, a remote user, such as a clinician, may interact with the electronic device 206 to adjust a feature of the ear-worn device, such as volume, output limits, signal-to-noise ratio, or any other suitable feature(s), as aspects of the technology described herein. Additionally, or alternatively, a remote user may access audio data and/or health data stored on electronic device 204.

Electronic device 206 may include one or more electronic devices. When the electronic device 206 includes more than one device, the devices may be located together in a same facility (e.g., the same medical facility, home, research facility, etc.) or the devices may be distributed among multiple, different locations (e.g., multiple medical facilities, homes, research facilities, etc.). The relative location of the electronic device 206 with respect to electronic device 204 and ear-worn device 202 may vary.

Figure 3A:
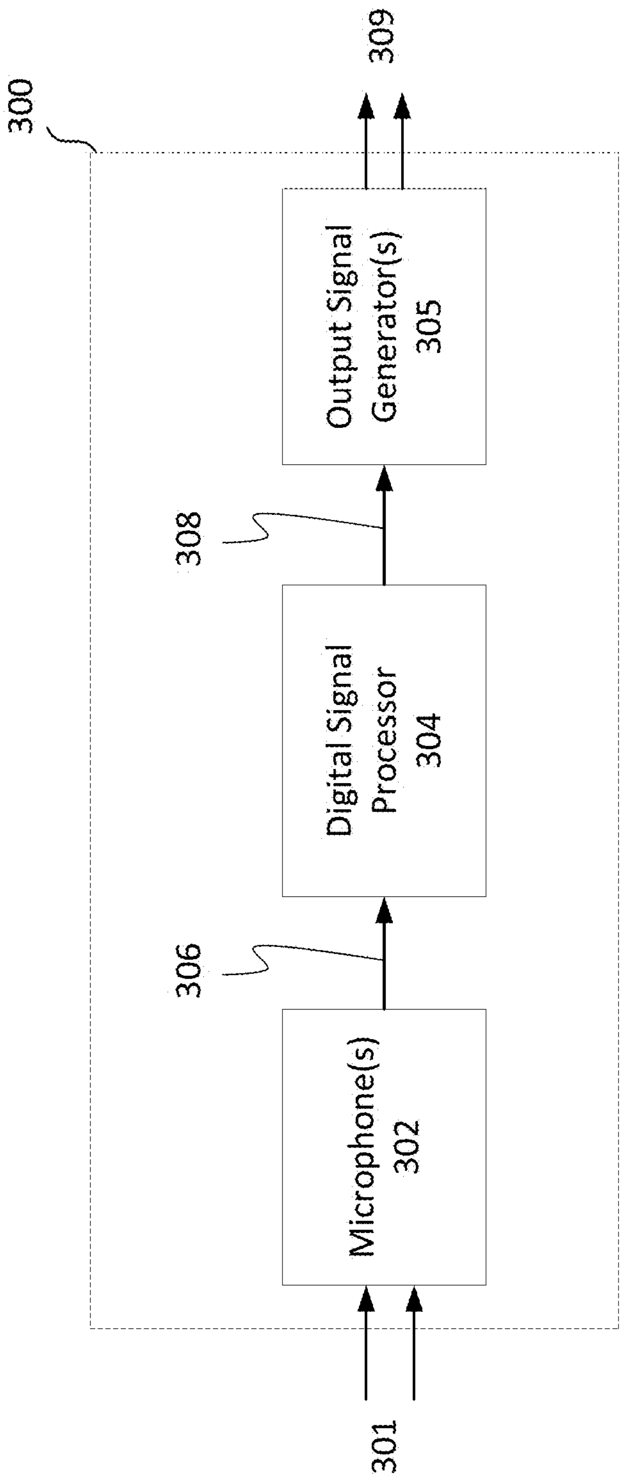
FIG. 3A illustrates example components of an ear-worn device that may be configured to enhance speech, according to a non-limiting embodiment of the present application.

FIG. 3A illustrates example components of an ear-worn device that may be configured to enhance speech, according to a non-limiting embodiment of the present application. In some embodiments, ear-worn device 300 may be an implementation of at least a portion of the ear-worn device 102 of FIG. 1 and 202 of FIG. 2. Ear-worn device 300 may include one or more microphones 302, and one or more output signal generators 305. In some embodiments, microphone(s) 302 may be configured to detect audio signal. The audio signal may be generated by the microphone(s) from sound 301, e.g., speech in a conversation. In a multi-speaker conversation, the audio signal detected by the microphone(s) may include speech components attributable to multiple speakers. In some embodiments, the audio signal detected by the microphone(s) may be analog signal. The ear-worn device 300 may additionally include an analog-to-digital converter (ADC, not shown) to convert the analog signal to digital signal 306 as input to the digital signal processor 304. In some embodiments, the microphone(s) 302 may be capable of producing digital audio signals. In such case, the audio signal detected by the microphone(s) may be digital signal 306, which can be directly provided to the digital signal processor 304.

With further reference to FIG. 3A, output signal generator(s) 305 may be configured to output the digital audio signal 309 for playback to the wearer of the ear-worn device. For example, the output signal generator(s) 305 may receive the digital signal 306 from the microphone(s) 302 and convert the digital signal 306 to analog signal before producing the output signal 309. In other examples, the ear-worn device may additionally include a digital-to-analog converter (DAC, not shown) to convert the digital signal 306 to analog signal as input to the output signal generator(s) 305 for providing the output signal 309.

In some embodiments, ear-worn device 300 may include a digital signal processor (DSP, 304) coupled between the microphone(s) 302 and the output signal generator(s) 305. The DSP 304 may be configured to process the digital signal and generate an enhanced output 308. For example, DSP 304 may include a frequency-based amplification.

Figure 3B:
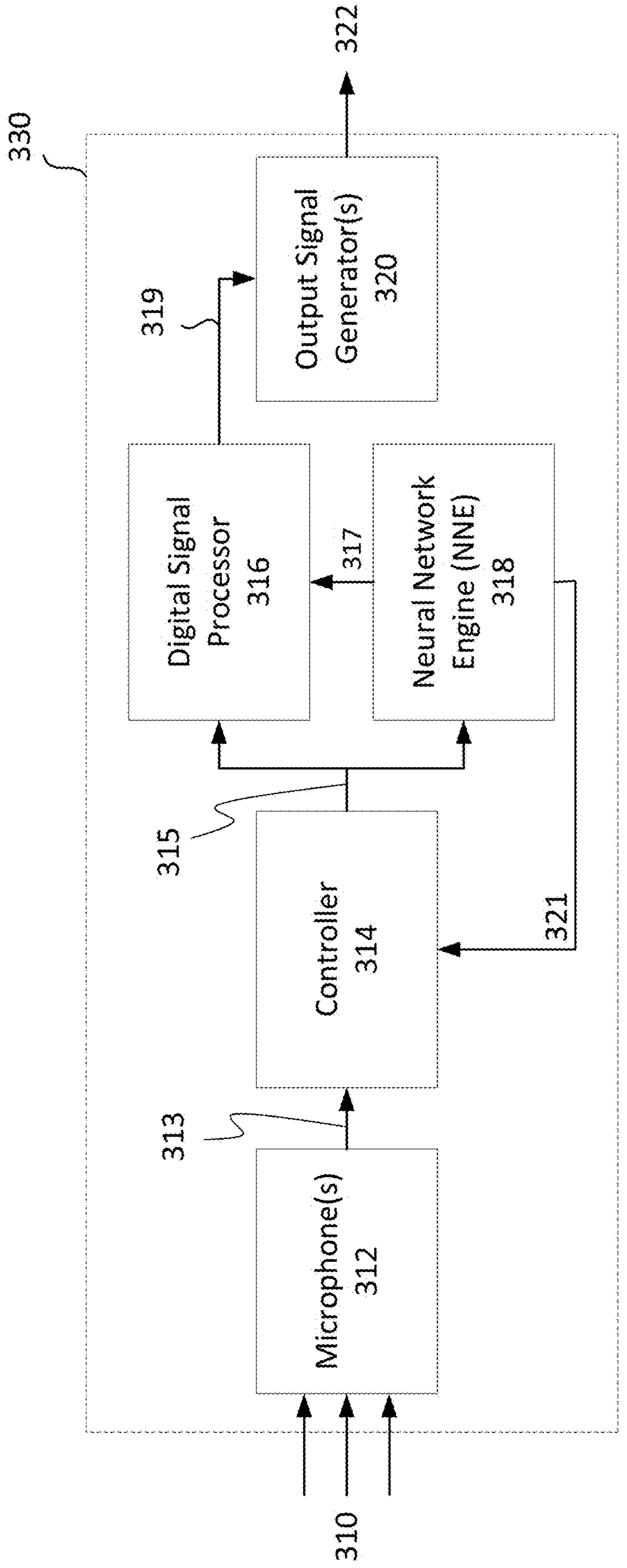
FIG. 3B illustrates example components of a variation of the ear-worn device in FIG. 3A that may be configured to enhance speech, according to a non-limiting embodiment of the present application.

FIG. 3B illustrates example components of a variation of the ear-worn device in FIG. 3A, according to a non-limiting embodiment of the present application. In some embodiments, ear-worn device 330 may be an example implementation of at least a portion of the ear-worn device 102 of FIG. 1 and 202 of FIG. 2. Ear-worn device 330 may have microphone(s) 312 and output signal generator(s) 320. In some embodiments, microphone(s) 312 are examples of microphone(s) 302 in FIG. 3A, and output signal generator(s) 320 are examples of output signal generator(s) 305 in FIG. 3A. Ear-worn device 330 may also include digital signal processor (DSP, 316), which, in some embodiments, is an example of DSP 304 in FIG. 3A. Additionally, ear-worn device 330 may include controller 314 configured to control both the neural network engine (NNE, 318) and DSP 316.

Controller 314 receives digital audio signal 313. Controller 314 may comprise one or more processor circuitries (herein, processors), memory circuitries and other electronic and software components configured to, among others, (a) perform digital signal processing manipulations necessary to prepare the signal for processing by the NNE 318 or the DSP 316, and (b) to determine the next step in the processing chain from among several options. In one embodiment of the disclosure, controller 314 executes a decision logic to determine whether to advance signal processing through one or both of DSP 316 and NNE 318. For example, DSP 316 may be activated at all times, whereas controller 314 executes decision logic to determine whether to activate the NNE 318 or bypass the NNE by deactivating the NNE 318.

In some embodiments, DSP 316 may be configured to apply a set of filters to the incoming audio components. Each filter may isolate incoming signals in a desired frequency range and apply a non-linear, time-varying gain to each filtered signal. The gain value may be set to achieve dynamic range compression or may identify stationary background noise. DSP 316 may then recombine the filtered and gained signals to provide an output signal 319.

As stated, in one embodiment, the controller performs digital signal processing operations to prepare the signal for processing by one or both of DSP 316 and NNE 318. NNE 318 and DSP 316 may accept as input the signal in the time-frequency domain (e.g., signal 325), so that controller 314 may take a Short-Time Fourier Transform (STFT) of the incoming signal before passing it onto either NNE 318 or DSP 316. In another example, controller 314 may perform beamforming of signals received at different microphones to enhance the audio signals coming from certain directions.

In certain embodiments, controller 314 continually determines the next step in the signal chain for processing the received audio data. For example, controller 314 activates NNE 318 based on one or more of user-controlled criteria, user-agnostic criteria, user clinical criteria, accelerometer data, location information, stored data and the computed metrics characterizing the acoustic environment, such as SNR. For example, in response to a determination that the speech is continual, or that the SNR of the input audio signal is above a threshold ratio, controller 314 may activate the NNE 318. Otherwise, controller 314 may deactivate the NNE 318, leaving the DSP 316 activated. This results in a power saving of the ear-worn device when the voice isolation network is not needed. If NNE 318 is not activated, controller 314 instead passes signal 315 directly to DSP 316. In some embodiments, controller 314 may pass data to both NNE 318 and DSP 316 simultaneously as indicated by arrows from controller 314 to DSP 316 and to NNE 318.

In some embodiments, user-controlled criteria may represent one or more logics (e.g., hardware- or software-implemented). In some examples, user-controlled criteria may comprise user inputs including the selection of an operating mode through an application on a user's smartphone or input on the ear-worn device (for example by the wearer of the ear-worn device tapping the device). For example, when a user is at a restaurant, she may change the operating mode to noise cancellation/speech isolation by making an appropriate selection on her smartphone. Additionally, and/or alternatively, user-controlled criteria may comprise a set of user-defined settings and preferences which may be either input by the user through an applet or an application (app) or learned by the device over time. For example, user-controlled criteria may comprise a user's preferences around what sounds the wearer of the ear-worn device hears (e.g., new parents may want to always amplify a baby's cry, or a dog owner may want to always amplify barking) or the user's general tolerance for background noise. Additionally, and/or alternatively, user clinical criteria may comprise a clinically relevant hearing profile, including, for example, the user's general degree of hearing loss and the user's ability to comprehend speech in the presence of noise.

User-controlled logic may also be used in connection with or aside from user-agnostic criteria (or logic). User-agnostic logic may consider variables that are independent of the user. For example, the user-agnostic logic may consider the hearing aid's available power level, the time of day or the expected duration of the NNE operation (as a function of the anticipated NNE execution demands).

In some embodiments, acceleration data as captured on sensors in the device may be used by controller 314 in determining whether to direct signal controller output signal 315 to one or both of DSP 316 and NNE 318. Movement or acceleration information may be used by controller 314 to determine whether the user is in motion or sedentary. Acceleration data may be used in conjunction with other information or may be overwritten by other data. Similarly, data from sensors capturing acceleration may be provided to the NNE as information for inference.

In other embodiments, the user's location may be used by controller 314 to determine whether to engage one or both of DSP 316 and NNE 318. Certain locations may require activation of NNE 318. For example, if the user's location indicates high ambient noise (e.g., the user is strolling through a park or is attending a concert) and no direct conversation, controller 314 may activate DSP 316 only and deactivate NNE 318. On the other hand, if the user's location suggests that the user is traveling (e.g., via car or train) and other indicators suggest human communication, then controller 314 may activate NNE 318 to enhance the audio signal by amplifying human voices over the surrounding noise.

In some embodiments, controller 314 may execute an algorithmic logic to select a processing path. For example, controller 314 may detect SNR of input audio signal 313 and determine whether one or both of DSP 316 and NNE 318 should be engaged. In one implementation, controller 314 compares the detected SNR value with a threshold value and determines which processing path to initiate. The threshold value may be one or more of empirically determined, user-agnostic or user-controlled. Controller 314 may also consider other user preferences and parameters in determining the threshold value as discussed above.

In another embodiment, controller 314 may compute certain metrics to characterize the incoming audio as input for determining a subsequent processing path. These metrics may be computed based on the received audio signal. For example, controller 314 may detect periods of silence, knowing that silence does not require the NNE to enhance, and it should therefore deactivate the NNE. In another example, controller 314 may include a Voice Activity Detector (VAD) to determine the processing path in a speech-isolation mode. In some embodiments, the VAD may be a compact (e.g., much less computationally intensive) neural network in the controller.

In an exemplary embodiment, controller 314 may receive the output of NNE 318 for recently processed audio, as indicated by arrow from NNE 318 to controller 314, as input to controller 314. NNE 318, which may be configured to isolate target audio in the presence of background noise, provides the inputs necessary to robustly estimate the SNR. Controller 314 may in turn use the output of the NNE 318 to detect when the SNR of the incoming signal is high enough or too low to influence the processing path. In still another example, the output of NNE 318 may be used to improve the robustness of VAD. Voice detection in the presence of noise is computationally intensive. By leveraging the output of NNE 318, ear-worn device 330 can implement this task with minimal computation overhead when the noise is suppressed based on isolated speech from the NNE.

When controller 314 utilizes NNE output 321, it can only utilize the output to influence the signal path for subsequently received audio signal. When a given sample of audio signal is received at the controller, the output of NNE 317 for that sample will be computed with a delay, where the output of the NNE, if computed before the next sample arrives, will influence the controller decision for the next sample. When the time interval of the sample is small enough, e.g., a few milliseconds or less than a second, such delay will not be noticeable by the wearer.

When NNE 318 is activated, using the output 321 of the NNE 318 in the controller does not incur any additional computational cost. In certain embodiments, controller 314 may engage NNE 318 for supportive computation even in a mode when NNE 318 is not the selected signal path. In such a mode, incoming audio signal is passed directly from controller 314 to DSP 316 but data (i.e., audio clips) is additionally passed at less frequent intervals to NNE 318 for computation. This computation may provide an estimate of the SNR of the surrounding environment or detect speech in the presence of noise in substantially real time.

NNE 318 may comprise one or more actual and virtual circuitries to receive controller output signal 315 and provide enhanced digital signal 317. In an exemplary embodiment, NNE 318 enhances the signal by using a neural network algorithm (NN model) to generate a set of intermediate signals. Each intermediate signal is a representative of one or more of the original sound sources that constitute the original signal. For example, incoming signal 310 may comprise of two speakers, an alarm and other background noise. In some embodiments, the NN model executed on NNE 318 may generate a first intermediate signal representing the speech and a second first intermediate signal representing the background noise. NNE 318 may also isolate one of the speakers from the other speaker. NNE 318 may isolate the alarm from the remaining background noise to ensure that the user hears the alarm even when the noise-canceling mode is activated. Different situations may require different intermediate signals and different embodiments may contain different neural networks with different capabilities best suited to the wearer's needs. In certain embodiments, a remote (off-chip) NNE may augment the capability of the local (on-chip) NNE. An NNE may include a recurrent NNE. Examples of neural network engines are described in U.S. patent application Ser. No. 17/576,718, which is incorporated by reference herein in its entirety.

With reference to FIGS. 3A and 3B, ear-worn devices 300 and 330 may each include a single ear-piece having a microphone. In other examples, ear-worn devices 300 and 330 may each be binaural and include two ear-pieces, each ear-piece having a respective microphone. Similarly, ear-worn devices 300 and 330 may each include one or more output signal generators respectively included in one or two ear-pieces.

Figure 4:
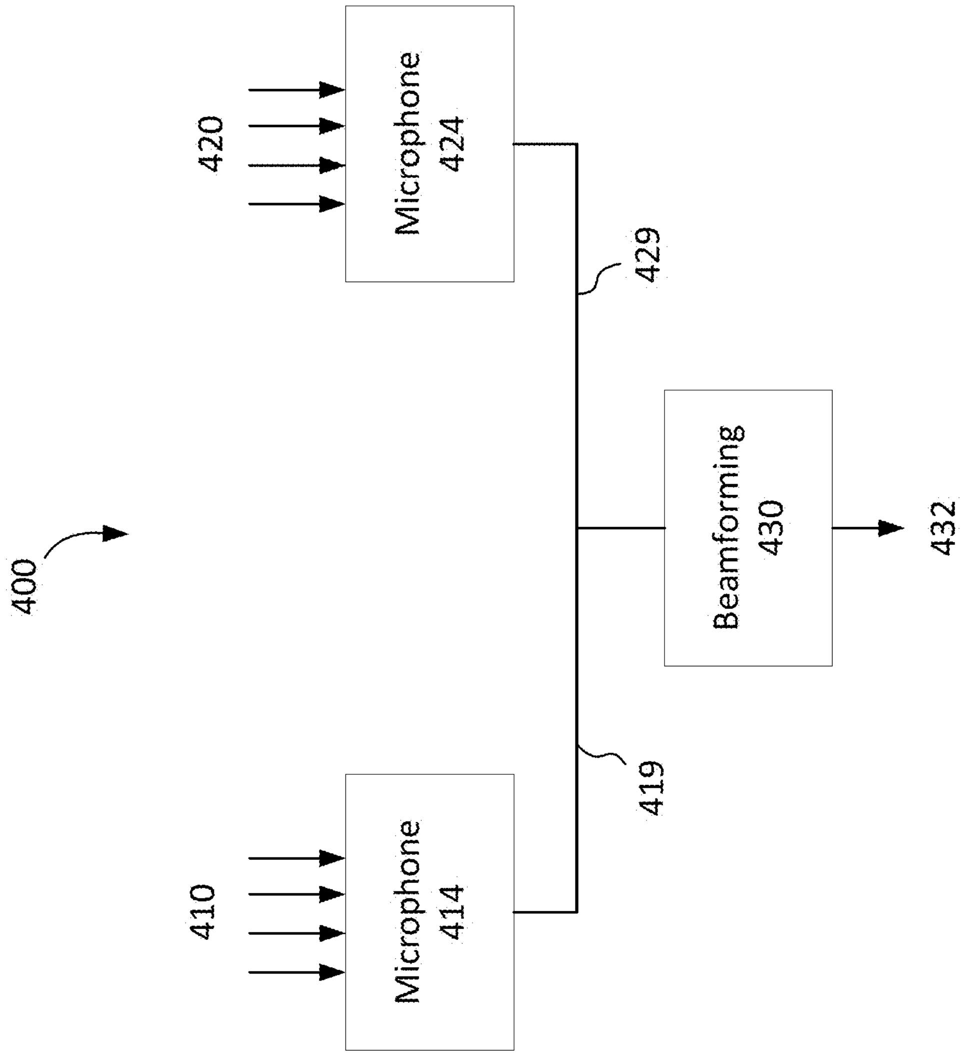
FIG. 4 illustrates example components of an ear-worn device having two microphones, according to a non-limiting embodiment of the present application.

FIG. 4 illustrates example components of an ear-worn device having two microphones, according to a non-limiting embodiment of the present application. FIG. 4 includes a portion of a circuitry 400 in an example ear-worn device. In some embodiments, the portion of circuitry 400 may be implemented in ear-worn device 102 (in FIG. 1), 202 (in FIG. 2), 300 (in FIG. 3A) and 330 (in FIG. 3B), where the ear-worn device is binaural.

In FIG. 4, circuitry 400 may include a beamformer 430 configured to process audio signal 419, 429 respectively detected from microphones 414 and 424. In some embodiments, both microphones 414, 424 reside in one ear-piece of the ear-worn device. In some embodiments, the microphones 414, 424 respectively reside in one of two ear-pieces of the ear-worn device. For example, microphone 414 may reside in a left ear-piece, while microphone 424 may reside in a right ear-piece. It should be appreciated, however, that the ear-worn device may include one or more additional microphones residing on one or both ear-pieces, as aspects of the technology described herein are not limited in this respect.

In some embodiments, beamformer 430 may be implemented in controller 330 of FIG. 3B. Beamformer 430 may generate an enhanced audio signal 432 that accounts for sounds from different directions as detected by microphones 414 and 424. As described above, the audio signals 419, 429 respectively detected by the microphones 414 and 424 may be digital signals. The output from the beamformer 430 may be digital signal as well. The enhanced audio signal 432 may be provided to a neural network engine (NNE) and/or a digital signal processor (DSP) in the ear worn device. In some embodiments, the NNE and DSP are examples of NNE 318 and DSP 316 described with respect to FIG. 3B. The output of the NNE and/or DSP may be provided to the receivers of two ear-pieces.

In some embodiments, each ear-piece may be configured to communicate with the other ear-piece and exchange audio signal with the other ear-piece. For example, beamformer 430 may be residing in a first ear-piece of an ear-worn device. The audio signal detected by the microphone of the other ear-piece may be transferred from the other ear-piece to the ear-piece in which the beamformer 430 is residing. The output of the NNE, or the output of the DSP (e.g., 304 in FIG. 3A, 316 in FIG. 3B) may be transferred back to the other ear-piece. It is appreciated that the two ear-pieces may be configured to communicate using any suitable protocol, such as near-field magnetic induction (NFMI) protocol, which allows for fast data exchange over short distances. Further, beamformer 430 may be optional, where a binaural audio stream may be detected from microphones 414 and 424 and provided to the NNE and/or DSP without using a beamformer.

In some embodiments, techniques for enhancing audio signals detected by an ear-worn device are provided. The techniques including processing one or more segments of the audio signal using a neural network engine, such as NNE 318 in FIG. 3B. As described herein, conventional neural network-based audio enhancement techniques rely on processing techniques, such as sequential processing, that incur high latencies, making such techniques unsuitable for implementation on in-person communication devices, such as hearing aids. The audio enhancement techniques developed by the inventors address the limitations of the conventional techniques by reducing latency associated with enhancing audio signals.

Figure 5:
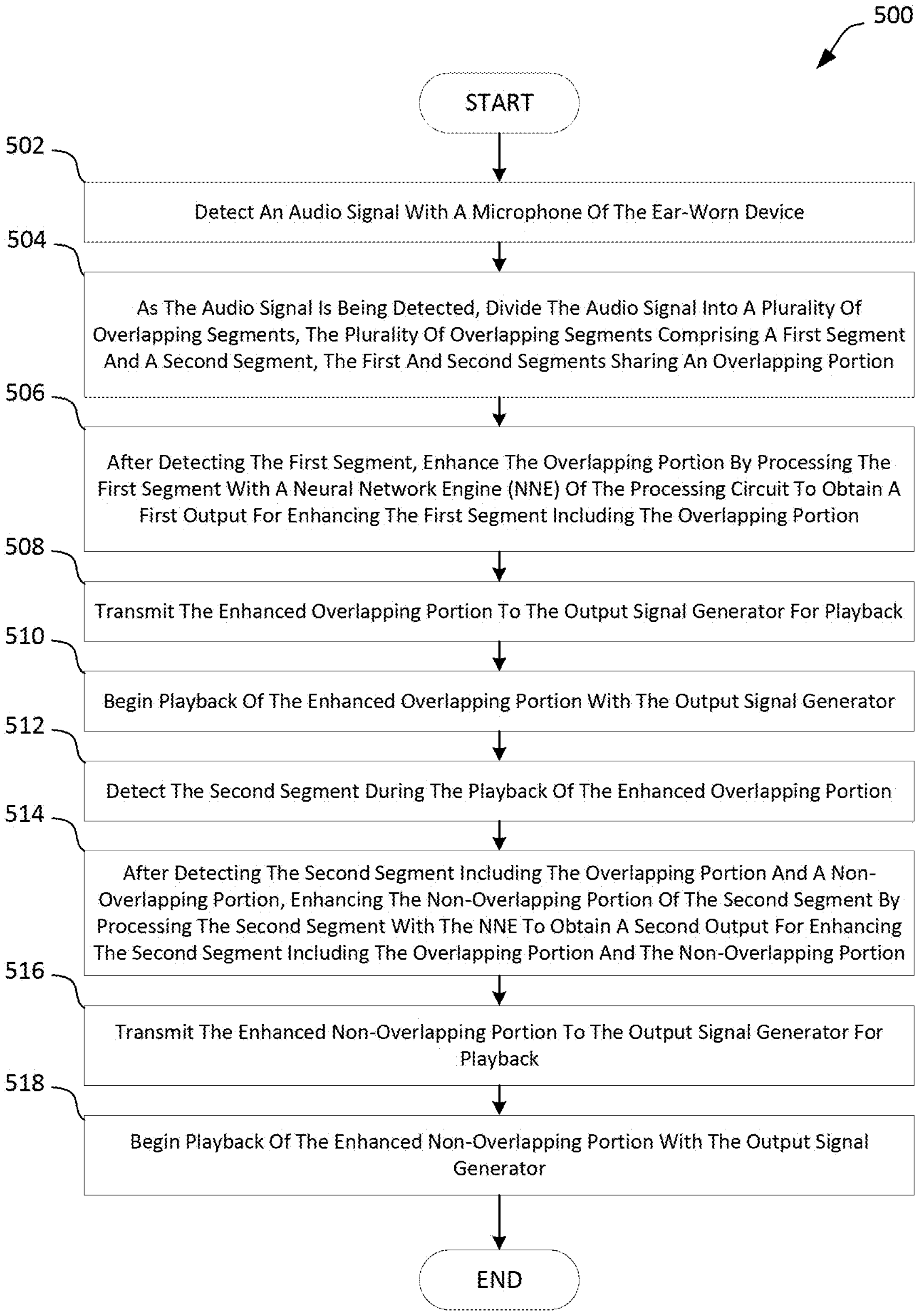
FIG. 5 is a flowchart of an example method for enhancing an audio signal detected by an ear-worn device, according to a non-limiting embodiment of the present application.

FIG. 5 is a flowchart of an example method 500 for enhancing an incoming audio signal, according to a non-limiting embodiment of the present application. In some embodiments, method 500 may be implemented on an ear-worn device such as 102 in FIG. 1, 202 in FIG. 2, 300 in FIG. 3A, 330 in FIG. 3B, or a circuitry of an ear-worn device such as 400 (in FIG. 4). The ear-worn device may include a microphone, a processing circuit coupled to the microphone, and an output signal generator coupled to the processing circuit. The processing circuit may include a neural network engine (NNE) and/or a digital signal processing (DSP) circuit. Method 500 may implement any of the operations in various embodiments described above.

At act 502, the microphone of an ear-worn device detects an audio signal. The audio signal may represent sound from the environment in which the ear-worn device is located. For example, the audio signal may represent speech of one or more speakers and/or sound from any other suitable sound sources. The audio signal may additionally, or alternatively, include one or more noise components.

At act 504, as the audio signal is being detected at act 502, the processing circuit of the ear-worn device divides the audio signal into a plurality of overlapping segments, including a first segment overlapping a second segment. For example, a controller of the processing circuit may divide the signal into the plurality of overlapping segments. A "segment" may also be referred to herein as a "window." It should be appreciated that while a first segment and a second segment are described herein, the plurality of overlapping segments may include additional segments such as a third segment. The third segment may overlap with one, or both, of the first segment and the second segment.

In some embodiments, each segment is of a particular length. The length may be any suitable length, as aspects of the technology described herein are not limited in this respect. However, it should be appreciated that the length may be selected (e.g., manually or automatically) to optimally balance latency and model performance. For example, a relatively long segment length may introduce high latency associated with receiving and processing the segment. By contrast, a relatively short segment length may hinder the performance of a neural network engine (NNE) used to process the segment due to the limited amount of information provided to the NNE. Nonlimiting examples of segment lengths include 1 millisecond, 2 milliseconds, 3 milliseconds, 4 milliseconds, 5 milliseconds, 8 milliseconds, 16 milliseconds, 32 milliseconds, 128 milliseconds, 256 milliseconds, at least 5 milliseconds, at least 8 milliseconds, at least 16 milliseconds, at least 32 milliseconds, at least 128 milliseconds, at least 256 milliseconds, between 1 millisecond and 256 milliseconds, or any other suitable length.

In some embodiments, the first and second segments overlap one another. Segments that overlap one another share a same portion of the audio signal, referred to herein as an "overlapping portion," of the audio signal. Consider, for example, an audio signal detected between an initial time, t=0 and an end time, t=50 milliseconds, that is divided into segments having lengths of 10 milliseconds. If the first segment of the audio signal includes the portion of the audio signal detected between 0 and 10 milliseconds, and the second segment of the audio signal includes the portion of the audio signal detected between 8 milliseconds and 18 milliseconds, then the first segment and the second segment each include the portion of the audio signal that was detected between 8 milliseconds and 10 milliseconds. This portion of the audio signal is the overlapping portion shared by the first segment and the second segment. In some embodiments, the difference between the beginning of the first segment (e.g., 0) and the beginning of the second segment (e.g., 8 milliseconds) is referred to as the "step size." In this example, the step size is 8 milliseconds. In some embodiments, the step size can be any suitable step size less than or equal to the segment length. If the step size is less than the segment length, then sequential segments will overlap one another. By contrast, if the step size is equal to the segment length, then sequential segments will not overlap one another.

At act 506, after detecting the first segment, the processing circuit enhances the overlapping portion. This includes, in some embodiments, processing the first segment with a neural network engine (NNE) to obtain a first output for enhancing the first segment including the overlapping portion.

The NNE may include any suitable NNE configured to generate an output for enhancing audio data, such as NNE 318 in FIG. 3B. In some embodiments, the NNE is configured to estimate, based on the first segment, one or more masks (also referred to herein as filters) for enhancing the first segment, including the overlapping portion. For example, a mask may isolate audio signals in a desired frequency range and/or apply a non-linear, time-varying gain to each filtered signal. A mask may suppress components of an audio signal attributable to noise and/or selectively enhance components of an audio signal attributable to one or more target sounds, such as the speech of a target speaker and/or the sound of a health event such as coughing, sneezing, snoring, swallowing, chewing, and wheezing.

In some embodiments, a portion of the enhanced segment is excluded from further processing. As described above, the NNE may be configured to estimate how the entire first segment should be enhanced. For example, it may estimate one or more masks for enhancing the entire first segment. Accordingly, in some embodiments, the entire first segment may be enhanced based on that output. In such an embodiment, only the overlapping portion of the enhanced first segment may be used for further processing, while the non-overlapping portion of the enhanced first segment may be discarded. For example, as described herein, only the enhanced overlapping portion may be transmitted to the output signal generator for playback. While it may seem counterintuitive to enhance the entire first segment, rather than just enhancing the overlapping portion, the approach of enhancing only the overlapping portion may not reliably account for past information, such as the non-overlapping portions of the first segment, because it would rely on recurrent layers of the NNE to remember such information. By processing the entire first segment of audio with the NNE to estimate how the overlapping portion should be enhanced, the NNE is certain to consider the non-overlapping portions of the first segment that precede the overlapping portion.

At act 508, the processing circuit transmits the enhanced overlapping portion to an output signal generator for playback. For example, the DSP of the processing circuit may transmit the enhanced portion to the output signal generator.

At act 510, the output signal generator begins playback of the enhanced overlapping portion. For example, the output signal generator may include output signal generator 212 in FIG. 2, output signal generator(s) 305 in FIG. 3A, or output signal generator(s) 320 in FIG. 3B.

In some embodiments, the output signal generator begins playback of the overlapping portion upon receiving the overlapping portion from the processing circuit. For example, the output signal generator may output the enhanced overlapping portion immediately or within a threshold time (e.g., within 0.1 ms, 0.2 ms, 0.3 ms, 0.5 ms, 0.8 ms, 1 ms, 1.5 ms, 2 ms, 3 ms, etc.) of receiving the enhanced overlapping portion from the processing circuit.

At act 512, during the playback of the enhanced overlapping portion, the microphone of the ear-worn device detects the second segment. The second segment includes the overlapping portion and a non-overlapping portion. For example, a non-overlapping portion may include audio data that was not included in the first segment. However, the non-overlapping portion may overlap with a subsequent segment, such as a third segment.

In some embodiments, enhancing and beginning playback of the overlapping portion prior to completing the detection and processing of the second segment reduces latency relative to conventional audio enhancement techniques. As described above, conventional neural network-based audio enhancement techniques do not enhance and/or output an enhanced portion of an audio signal until all segments that include that portion of the audio signal have been received and processed with the NNE. For example, for a first segment and a second segment sharing an overlapping portion, the conventional techniques would wait until both segments have been both (a) detected and (b) processed using the NNE, prior to enhancing and beginning playback of the overlapping portion. For example, the outputs of the NNE, resulting from processing both segments, would be averaged and used to enhance the overlapping portion. While such techniques may improve the accuracy of enhancing the overlapping portion, they incur a greater latency than the techniques described herein, which enhance and playback an enhanced portion of a segment of an audio signal prior to completing the detection and processing of all segments that include an overlapping portion.

At act 514, after detecting the second segment, the processing circuit enhances the non-overlapping portion of the second segment. This includes, in some embodiments, processing the second segment with the NNE to obtain a second output for enhancing the second segment including the overlapping portion and the non-overlapping portion.

As should be appreciated from the foregoing, the ear-worn device has already enhanced and begun playback of the overlapping portion. Therefore, it may seem counterintuitive to again process the overlapping portion with the NNE, since the estimate for how the overlapping portion should be enhanced will not be used by the ear-worn device. However, it may be advantageous to process the overlapping portion of the second segment with the NNE, in addition to the non-overlapping portion, to estimate how the non-overlapping portion should be enhanced. This is because the NNE can use the information about the overlapping portion (e.g., past information) to predict how the more-recent, non-overlapping portion should be enhanced. Only processing the non-overlapping portion would reduce the information provided to the NNE, thereby decreasing the accuracy of the prediction output by the NNE.

At act 516, the processing circuit transmits the enhanced non-overlapping portion to the output signal generator for playback. At act 518, the output signal generator begins playback of the enhanced non-overlapping portion.

Figure 6A:
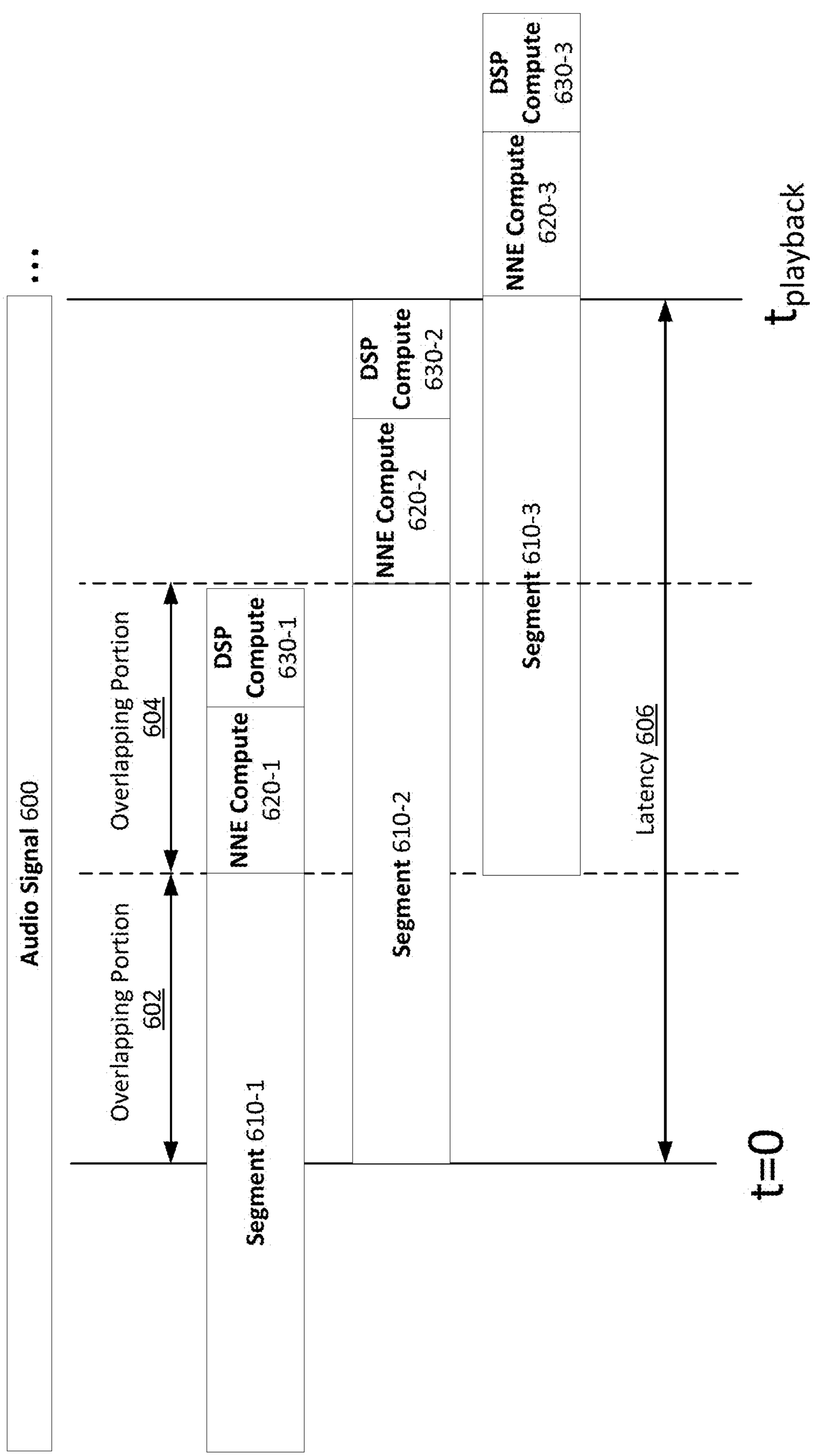
FIG. 6A is a block diagram illustrating an example of processing multiple overlapping segments of an audio signal to generate a continuous output signal, according to a non-limiting embodiment of the present application.

FIG. 6A is a block diagram illustrating an example of processing multiple overlapping segments of an audio signal to generate a continuous output signal, according to a non-limiting embodiment of the present application.

An audio signal 600 may be detected by an ear-worn device (e.g., a hearing aid). For example, the audio signal 600 may be detected by a microphone of the ear-worn device.

As the audio signal 600 is detected, a processing circuit of the ear-worn device may be used to divide the audio signal 600 into a plurality of overlapping segments, including segment 610-3, segment 610-2, and segment 610-1.

Segment 610-3 overlaps segment 610-2 and precedes both segments 610-2 and 610-1 in time. In other words, segment 610-3 includes a portion of the audio signal 600 that was detected earlier than portions of the audio signal 600 included in segments 610-2 and 610-1.

As indicated by the position of segment 610-3 with respect to $t_{playback}$, segment 610-3 has already been received, processed, and enhanced by the processing circuit. For example, the segment 610-3 may have been processed by a neural network engine (NNE) of the processing circuit and enhanced by a digital signal processing (DSP) circuit of the processing circuit based on the output of the NNE. Accordingly, the total latency 606 incurred by processing segment 610-3 may be determined by the sum of: the length of the segment 610-3, the NNE compute time 620-3, and the DSP compute time 630-3. At $t_{playback}$, after the delay due to latency 606, processing circuit 610-3 begins transmitting segment 610-3 to an output signal generator for output to a wearer.

As shown, segment 610-3 and segment 610-2 share an overlapping portion 604. Accordingly, the NNE may twice predict (e.g., for both segment 610-3 and segment 610-2), how the overlapping portion 604 should be enhanced. Therefore, in some embodiments, both predictions for the overlapping portion 604 may be used to enhance the overlapping portion 604. For example, as described herein including at least with respect to act 526 of method 500 in FIG. 5, the processing circuit of the ear-worn device may determine an average or a weighted average of the outputs of the NNE, and the DSP may use the combined outputs to enhance the overlapping portion 604. In some embodiments, each NNE output predicted for a particular overlapping portion of the audio signal 600 may be referred to as a "vote."

Segment 610-2 also overlaps segment 610-1. In particular, segment 610-1 and segment 610-2 share overlapping portion 602. Similarly, the NNE may twice predict (e.g., both for segment 610-2 and 610-1), how the overlapping portion 604 should be enhanced, and both predictions may be combined (e.g., by determining an average or weighted average) and used to enhance the overlapping portion 602.

As shown in FIG. 6A, the processing circuit waits to output segment 610-2 until the full segment 610-2 has been detected and processed, and all available NNE predictions have been made for the segment. In other words, the processing circuit waits to output overlapping portion 604 until (a) segment 610-2 and segment 610-3 have been fully detected, and (b) segment 610-2 and segment 610-3 have each been processed with the NNE to obtain two predictions for the overlapping portion 604. Similarly, the processing circuit waits to output overlapping portion 602 until (a) segment 610-2 and segment 610-1 have been fully detected, and (b) segment 610-2 and segment 610-1 have each been processed with the NNE to obtain two predictions for the overlapping portion 602.

Accordingly, in some embodiments, the latency 606 of segment 601-2 may be determined by the sum of: the length of the segment 610-2, the NNE compute time 620-2, and the DSP compute time 630-2. The total latency 606 incurred by segment 610-1 may be determined by the sum of: the length of the segment 610-1, the NNE compute time 620-1, and the DSP compute time 630-1.

While the overlapping portion 602 has already been detected and processed by the NNE, the processing circuit waits to output overlapping portion 602 until the entire segment 610-1 has been detected and processed with the NNE.

However, as described herein including at least with respect to FIG. 5, the latency of the audio enhancement techniques may be reduced by enhancing and outputting a portion of a segment of the audio signal as soon as there is a prediction available for that portion, rather than waiting for subsequent segments to be completely detected and processed.

Figure 6B:
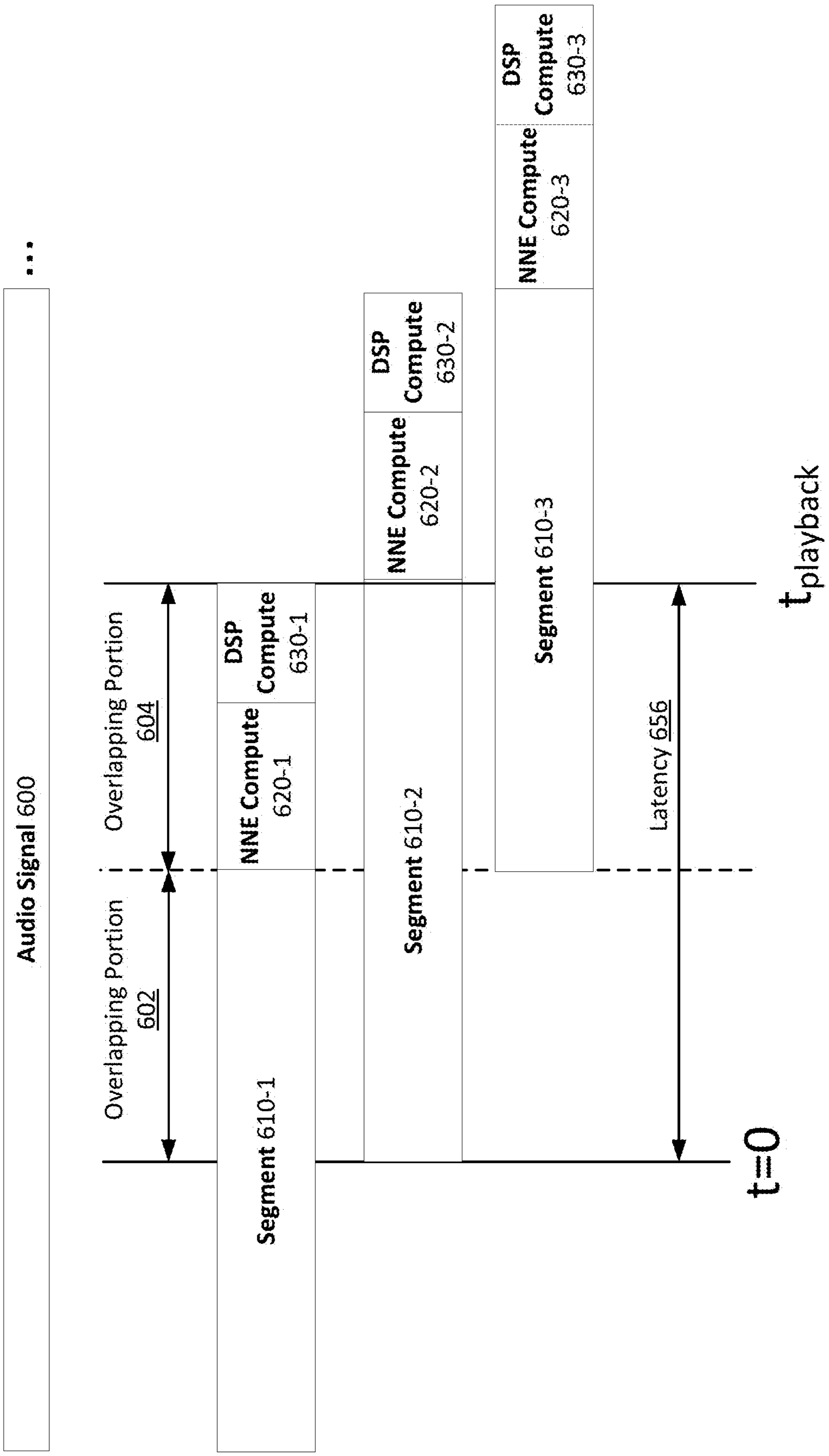
FIG. 6B is a block diagram illustrating a variation of the example in FIG. 6A for reducing latency of processing multiple overlapping segments of an audio signal, according to a non-limiting embodiment of the present application.

FIG. 6B is a block diagram illustrating a variation of the example in FIG. 6A for reducing latency of processing multiple overlapping segments of an audio signal, according to a non-limiting embodiment of the present application. As shown, rather than waiting to enhance and output (e.g., to transmit to an output signal generator) an overlapping portion of audio data until each segment including that overlapping portion of audio data has been completely detected and processed with the NNE, the processing circuit instead enhances and outputs the overlapping portion, as soon as at least one prediction for enhancing that portion is available.

Consider, for example, overlapping portion 602. Instead of waiting until the processing circuit finishes detecting and processing segment 610-1 (e.g., the overlapping portion 602 and the non-overlapping portions preceding time, t=0), the processing circuit enhances and outputs overlapping portion 602 as soon as there is at least one NNE prediction available. In this case, the processing circuit enhances the overlapping portion based on the output of the NNE obtained by processing segment 610-2. Therefore, the latency 656 is determined by the sum of: the length of the overlapping portion 602, the NNE compute time, and the DSP compute time. However, it should be appreciated that this may vary when there are multiple segments that share the same overlapping portion, as described herein in more detail.

As a result, the latency 656 may be significantly reduced relative to the latency 606. Consider, for example, a scenario where segment 610-1 and segment 610-2 each have a length of 10 milliseconds, and they share an overlapping portion 602 of 5 milliseconds. Latency 656 would be reduced by 5 milliseconds relative to latency 606.

In some embodiments, the techniques described herein may be applied when more than two segments share an overlapping portion of an audio signal. Consider, for example, an ear-worn device that divides an audio signal into 4 millisecond segments, with a step size of 1 millisecond. In such a scenario, four segments will share the same overlapping portion of an audio signal having a length of 1 millisecond. An example of such a scenario is shown in FIG. 6C.

Figure 6C:
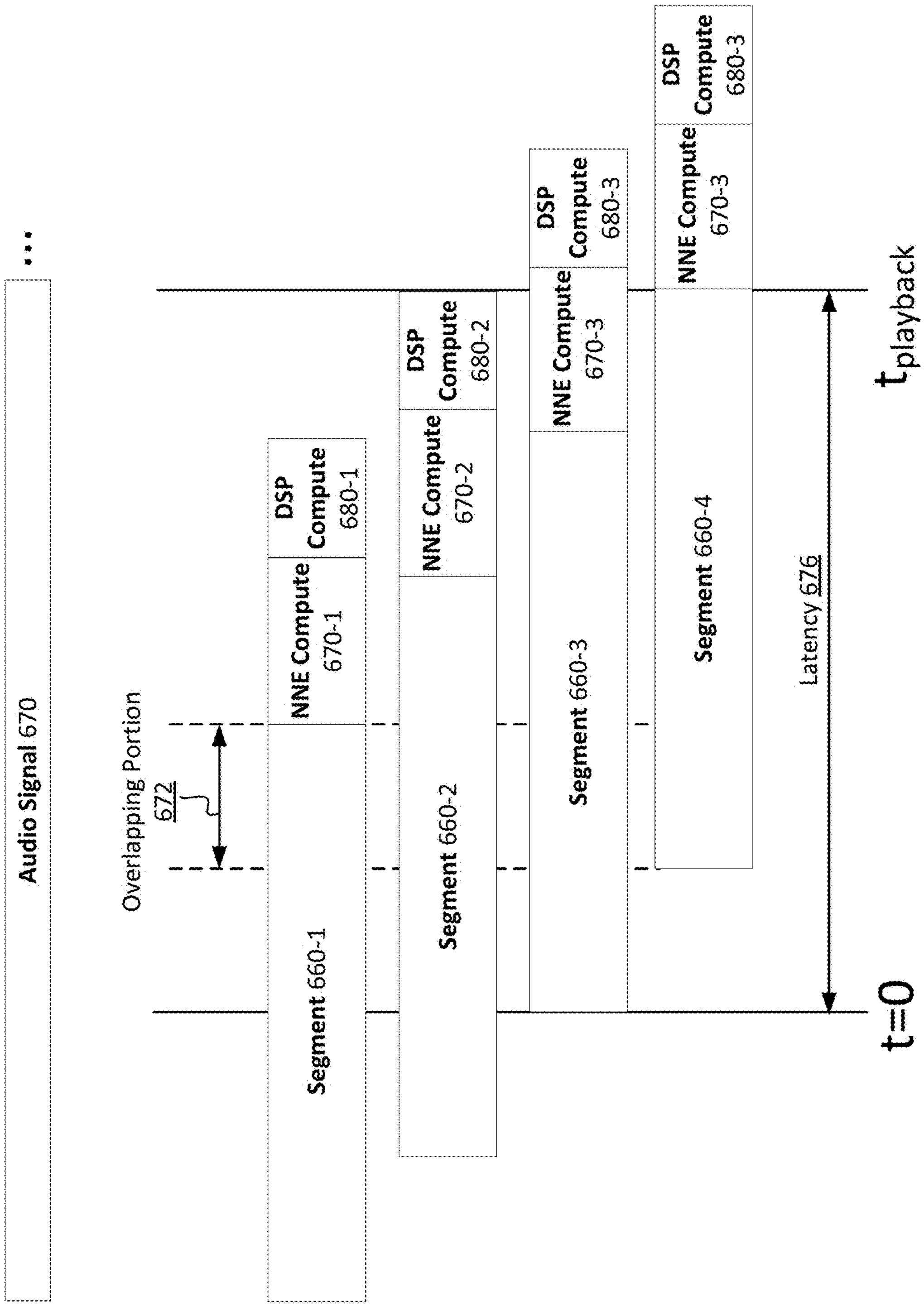
FIG. 6C is a block diagram illustrating a variation of the example in FIG. 6A for reducing latency of processing multiple overlapping segments of an audio signal, according to a non-limiting embodiment of the present application.

As shown in FIG. 6C, segments 660-1, 660-2, 660-3, and 660-4 each share the same overlapping portion 672 of audio signal 670. As described herein, in some embodiments, overlapping portion 672 could be enhanced and output as soon as at least one of segments 660-1, 660-2, 660-3, and 660-4 is finished being detected and processed. In such an embodiment, even though three other NNE estimates may become available for enhancing that overlapping portion, only one NNE estimate may be used to enhance the overlapping portion, thereby reducing the latency incurred by waiting on the other three segments. However, it should be appreciated that using additional NNE estimates to predict how to enhance the overlapping portion may improve the accuracy of such an enhancement because it would consider information about more-recently detected audio data. Therefore, in some embodiments, the techniques described herein include enhancing an overlapping portion based on the outputs of processing N segments with the NNE, where each of the N segments include the overlapping portion, and where N is less than the total number of segments sharing the overlapping portion.

Referring again to FIG. 6C, the processing circuit of the ear-worn device is configured to wait to complete the detection and processing of two out of four of the segments 660-1, 660-2, 660-3, and 660-4 before enhancing overlapping portion 672. As shown, the overlapping portion 672 is enhanced and output as soon as the detection and processing of segment 660-4 and segment 660-3 is complete. The ear-worn device does not wait for segments 660-1 and 660-2 to be fully detected and processed, even though they too include the overlapping portion. Therefore, latency 676 is determined based on the sum of: two times the step size, the NNE compute time, and the DSP compute time. The latency is reduced relative to conventional techniques, which would wait for all four segments to be completely detected and processed, and thus the latency would be increased by an additional two times the step size.

In some embodiments, the results of processing of segment 660-4 and segment 660-3 are combined to determine how to enhance the overlapping portion 672. For example, the outputs of processing segment 660-3 and segment 660-4 with the NNE may be averaged to determine how to enhance the overlapping portion 672. Because segment 660-3 includes information about more-recently detected audio data and segment 660-4 includes information about past audio data, both NNE outputs may help to more accurately inform how the overlapping portion 672 should be enhanced.

While the example shown in FIG. 6C includes four segments that share the same overlapping portion, it should be appreciated that the number of segments sharing an overlapping portion may vary depending on the step size and/or segment length. Additionally, or alternatively, though the example shown in FIG. 6C waits for two out of four segments to be completely processed before enhancing the overlapping portion, the techniques may be modified such that only one segment is completely detected and processed, or such that three out of four of the segments are completely detected and processed, before enhancing the overlapping portion.

Figure 7:
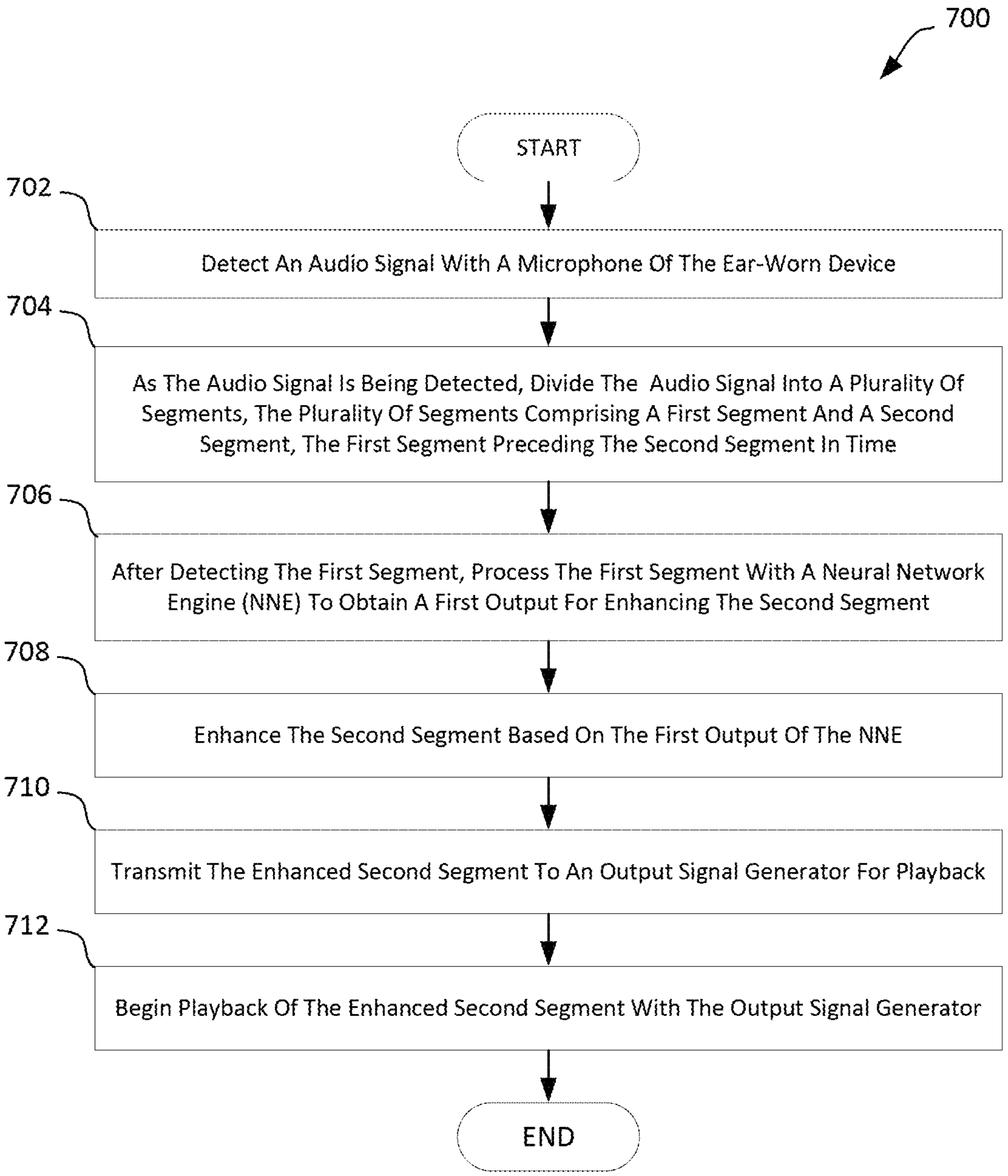
FIG. 7 is a flowchart of an example method for enhancing an audio signal detected by an ear-worn device, according to a non-limiting embodiment of the present application.

FIG. 7 is a flowchart of an example method for enhancing an incoming audio signal, according to a non-limiting embodiment of the present application. In some embodiments, method 700 may be implemented on an ear-worn device such as 102 in FIG. 1, 202 in FIG. 2, 300 in FIG. 3A, 330 in FIG. 3B, or a circuitry of an ear-worn device such as 400 (in FIG. 4). The ear-worn device may include a microphone, a processing circuit coupled to the microphone, and an output signal generator coupled to the processing circuit. The processing circuit may include a neural network engine (NNE) and/or a digital signal processing (DSP) circuit. Method 700 may implement any of the operations in various embodiments described above.

At act 702, the microphone of an ear-worn device detects an audio signal. The audio signal may represent sound from the environment in which the ear-worn device is located. For example, the audio signal may represent speech of one or more speakers and/or sound from any other suitable sound sources. The audio signal may additionally, or alternatively, include one or more noise components.

At act 704, as the audio signal is being detected, the processing circuit of the ear-worn device divides the detected audio signal into a plurality of segments, including a first segment and a second segment. For example, a controller of the processing circuit may divide the signal into the plurality of segments. It should be appreciated that while a first segment and a second segment are described herein, the plurality of segments may include additional segments such as a third segment.

In some embodiments, the first segment precedes the second segment in time. The first and second segments may or may not overlap one another. Consider, for example, an audio signal detected between an initial time, t=0 and an end time, t=50 milliseconds, that is divided into segments having a length of 10 milliseconds. The first segment may include the portion of the audio signal detected between 0 and 10 milliseconds, while the second segment may include the portion of the audio signal detected between 10 and 20 milliseconds. As another example, the first segment may include the portion of the audio signal detected between 0 and 10 milliseconds, while the second segment may include the portion of the audio signal detected between 6 milliseconds and 16 milliseconds.

At act 706, after detecting the first segment, the processing circuit of the ear-worn device processes the first segment with a neural network engine (NNE) to obtain a first output for enhancing the second segment. The NNE may include any suitable NNE configured to generate an output for enhancing detected audio signals, such as NNE 318 in FIG. 3B. In some embodiments, the NNE processes the first segment to obtain a first output for enhancing the second segment. Additionally, or alternatively, in some embodiments, the NNE processes the first segment to obtain an output for enhancing the first segment. Additionally, or alternatively, in some embodiments, the NNE processes the first segment to obtain an output for enhancing one or more subsequent segments, such as a third segment detected after the second segment.

In some embodiments, the NNE is configured to estimate, based on the first segment, one or more masks (also referred to herein as filters) for enhancing the second segment. For example, a mask may isolate audio signals in a desired frequency range and/or apply a non-linear, time-varying gain to each filtered signal. A mask may suppress components of an audio signal attributable to noise and/or selectively enhance components of an audio signal attributable to one or more target sounds, such as the speech of a target speaker and/or the sound of a health event such as coughing, sneezing, snoring, swallowing, chewing, and wheezing. In some embodiments, the first output of the NNE includes a first set of one or more masks estimated for enhancing the second segment. Additionally, or alternatively, the first output may include data indicative of the first set of one or more masks.

At act 708, the processing circuit is configured to enhance the second segment based on the first output of the NNE. In some embodiments, as described above, the first output is indicative of how the detected audio signal should be processed. In some embodiments, a digital signal processor (DSP), such as DSP 304 in FIG. 3A and DSP 316 in FIG. 3B, performs the enhancing. For example, the DSP may use the first output to enhance the second segment. For example, the DSP may apply one or more masks to the second segment to generate an enhanced second segment.

At act 710, the processing circuit transmits the enhanced second segment to the output signal generator for playback. At act 712, the output signal generator begins playback of the enhanced second segment. For example, the output signal generator may include output signal generator 212 in FIG. 2, output signal generator(s) 305 in FIG. 3A, or output signal generator(s) 320 in FIG. 3B.

In some embodiments, beginning playback of the enhanced second segment includes outputting the enhanced second segment upon receiving the enhanced second segment from the processing circuit. For example, the output signal generator may output the enhanced second segment immediately or within a threshold time (e.g., within 0.1 ms, 0.2 ms, 0.3 ms, 0.5 ms, 0.8 ms, 1 ms, 1.5 ms, 2 ms, 3 ms, etc.) of receiving the enhanced second segment from the processing circuit. This includes, in some embodiments, outputting the enhanced audio signal prior to completing a processing of the second segment. Accordingly, the enhanced second segment may be output to a wearer of the ear-worn device with a shorter delay than if the second segment was enhanced using conventional neural network-based audio enhancement techniques, which wait to enhance the second segment using an output obtained from the NNE as a result of processing the second segment with the NNE.

In some embodiments, the method 700 reduces latency by processing the second segment with the NNE in parallel with enhancing the second segment, instead of waiting to enhance the second segment until after the neural network processing is complete. For example, after detecting the second segment, the processing circuit of the ear-worn device may process the second segment to generate an output for enhancing a third segment, where the third segment is detected after the second segment. Rather than waiting to complete the processing of the second segment to enhance the second segment, the techniques described herein can use the results of processing the first segment to enhance the segment. If the first and second segments do not overlap one another, then the latency can be reduced to just the time that it takes to enhance the second segment. Accordingly, the enhanced second segment may be output to a wearer of the ear-worn device with a shorter delay than if the second segment was enhanced using conventional neural network-based audio enhancement techniques, which would wait to detect the second segment, process the second segment using the neural network engine, and enhance the second segment based on the result of the processing.

Figure 8A:
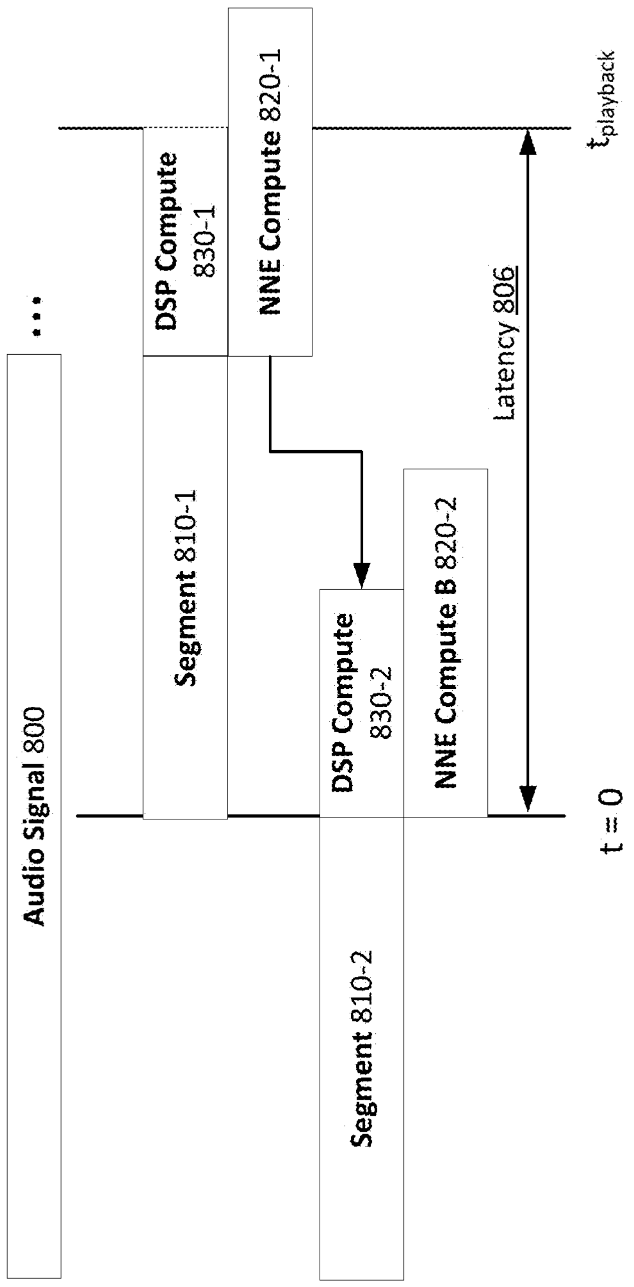
FIG. 8A is a block diagram illustrating an example of processing multiple segments of an audio signal to generate a continuous output signal, according to a non-limiting embodiment of the present application.

FIG. 8A is a block diagram illustrating an example of processing multiple segments of an incoming audio signal to generate a continuous output signal, according to a non-limiting embodiment of the present application.

An audio signal 800 may be detected by an ear-worn device (e.g., a hearing aid). For example, the audio signal 800 may be detected by a microphone of the ear-worn device.

As it is being detected by the microphone, a processing circuit of the ear-worn device may be used to divide the audio signal 600 into a plurality of segments, including segment 810-2 and segment 810-1.

As described herein, conventional neural-network based audio enhancement techniques typically use sequential processing, and other, similar techniques for processing a segment of audio data. The latency incurred by processing a segment of an audio signal according to such techniques is determined by the sum of: the length of the segment, the NNE compute time, and the DSP compute time. In particular, the NNE is used to predict how the segment should be enhanced, then the DSP is used to enhance the segment based on that prediction.

However, as described herein, including at least with respect to FIG. 7, to reduce the latency of processing a segment, the segment may instead be processed by the NNE and the DSP in parallel. For example, as shown in FIG. 8A, segment 810-1 may be passed through the NNE and the DSP in parallel. As a result, the latency 806 incurred by segment 810-1 is determined by the sum of the length of the segment 810-1 and the DSP compute time 830-1.

However, because the segment is 810-1 is passed through the NNE and the DSP in parallel, the output of the NNE is not available to the DSP for enhancing the segment 810-1.

Accordingly, as described herein including at least with respect to FIG. 7, the processing circuit may instead apply the NNE output generated by processing a preceding segment of the audio signal.

For example, as shown in FIG. 8A, segment 810-1 is processed with the NNE to obtain a prediction for enhancing the segment 810-2 (e.g., a first output). In some embodiments, the first output of the NNE is used by the DSP to enhance a later segment, such as segment 810-2. Once the segment 810-2 has been enhanced, it is ready for output and does not have to wait until the processing circuit has completed processing the segment 810-2 with the NNE. Accordingly, the latency for processing segment 810-1 is reduced by eliminating the NNE compute time 820-2.

Figure 8B:
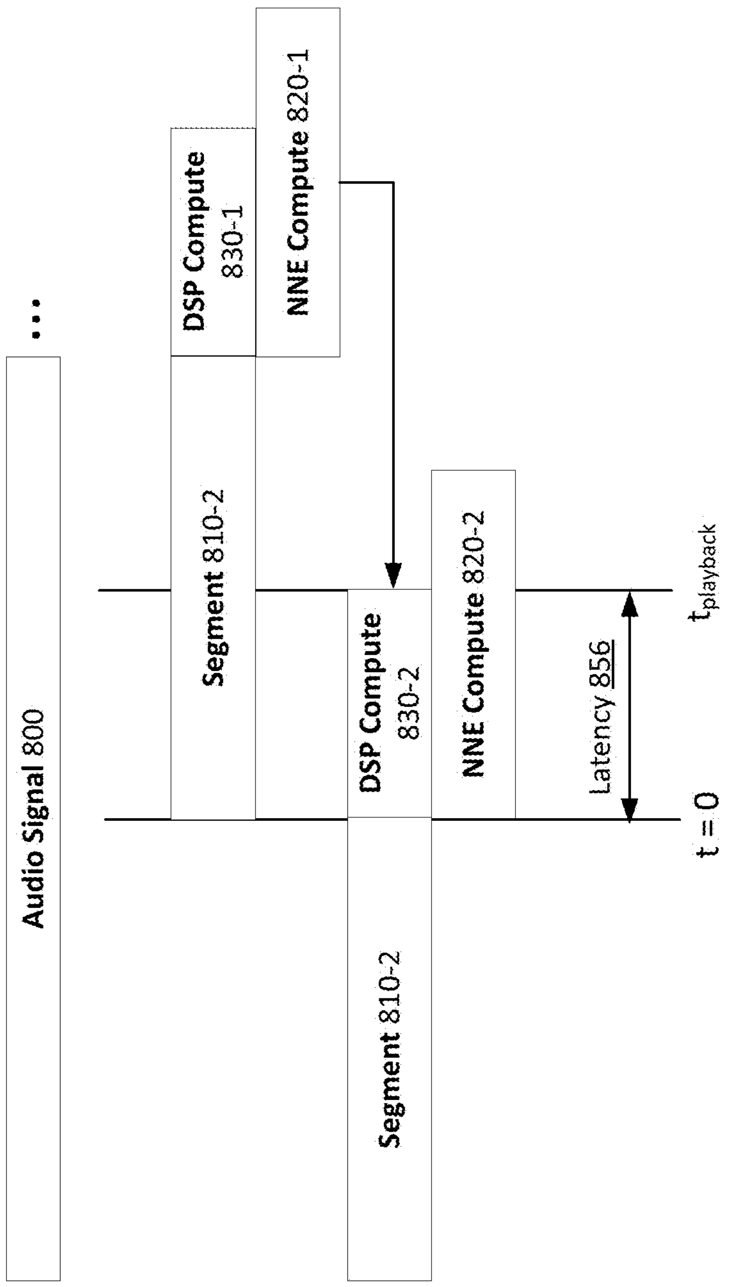
FIG. 8B is a block diagram illustrating a variation of the example in FIG. 8A for reducing latency of processing multiple segments of an audio signal, according to a non-limiting embodiment of the present application.

In the example of FIG. 8B, as indicated by the position of $t_{playback}$, the processing circuit waits until it has received the entire length of segment 810-2 to enhance the segment 810-2 with the DSP, and to output the enhanced segment 810-2. However, the NNE output (e.g., obtained by processing the segment 810-1 with the NNE) was available to the DSP as soon as segment 810-2 was received at the processing circuit.

Therefore, in some embodiments, the processing circuit may enhance a segment as soon as the NNE output is available, thereby further reducing the latency incurred by processing the segment 810-2.

FIG. 8B is a block diagram illustrating a variation of the example in FIG. 8A for reducing latency of processing multiple segments of an audio signal, according to a non-limiting embodiment of the present application. As shown, the processing circuit processes segment 810-2 with the DSP (indicated by DSP compute 830-2) as soon as the output of NNE compute 820-1 is available, thereby reducing the latency 806 to latency 856, the length of the DSP compute time 830-2.

As shown in FIGS. 8A-8B, a segment (e.g., segment 810-2) may be processed using an NNE to obtain an NNE output that may be applied to a later segment (e.g., segment 810-2). In some embodiments, the processing circuit may receive several segments of the audio signal before an updated NNE output for enhancing the detected audio signal is obtained. For example, FIG. 8C shows a variation of the examples shown in FIGS. 8A-8B.

Figure 8C:
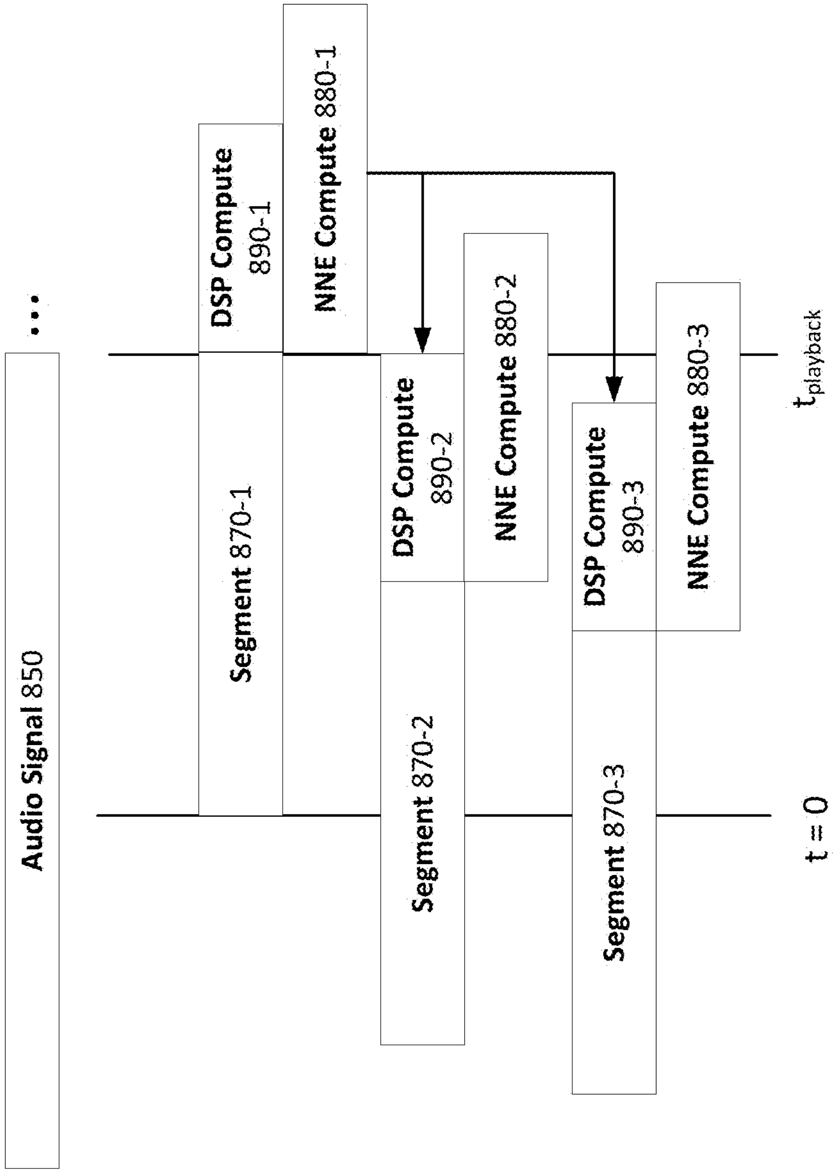
FIG. 8C is a block diagram illustrating a variation of the example in FIG. 8A for reducing latency of processing multiple overlapping segments of an audio signal, according to a non-limiting embodiment of the present application.

In FIG. 8C, audio signal 850 is divided into several overlapping segments: 870-1, 870-2, and 870-3. As shown, the processing circuit processes segment 870-1 with an NNE (e.g., NNE compute 880-1) and DSP (e.g., DSP compute 890-1). Processing circuit also processes segments 870-2 and 870-3 with the NNE and DSP.

As shown, since the processing circuit processes segment 870-2 with the NNE in parallel with DSP, the output of the NNE (e.g., NNE compute 880-2) is not available to the DSP (e.g., DSP compute 890-2) for enhancing segment 870-2. Accordingly, the DSP uses the NNE output generated by processing segment 870-1 with the NNE (e.g., NNE compute 880-1) to enhance segment 870-2.

Similarly, the processing circuit processes segment 870-3 with the NNE in parallel with the DSP. Since the output of the NNE (e.g., NNE compute 880-3) is not yet available to the DSP, the DSP cannot use said output to enhance segment 870-3. Additionally, the NNE output generated by processing segment 870-2 with the NNE compute (e.g., NNE 880-2) is not available to the processing circuit when the processing circuit begins to receive segment 870-3. Accordingly, said output (e.g., the output of NNE compute 880-2) cannot be used by the DSP to enhance segment 870-3. The DSP instead uses the NNE output generated by processing segment 870-1 with the NNE (e.g., NNE compute 890-1).

In additional, or alternative, embodiments of the technology described herein, latency can further be reduced by selectively processing segments of an audio signal with a neural network engine (NNE). For example, the ear-worn device may detect an audio signal with a microphone and divide the audio signal into a plurality of segments using a processing circuit. In some embodiments, a controller of the ear-worn device is configured to process a segment of the audio signal to determine whether to (a) transmit the segment to the NNE and/or DSP, or (b) output the segment without processing the segment with the NNE or DSP, thereby reducing, if not eliminating, the latency associated with processing the segment. For example, the controller may process the segment to determine a level of noise represented by the segment, and to determine whether the level of noise satisfies noise criteria. For example, if the level of noise exceeds a noise threshold, indicating a noisy environment, then the controller may transmit the segment to the NNE and/or DSP for enhancement. For example, the NNE and/or DSP may process the segment to remove one or more noise components and/or enhance target sound. If the level of noise does not exceed the noise threshold, indicating little to no noise, then the controller may transmit the segment to the output signal generator to be output to the wearer.

In additional, or alternative, embodiments of the technology described herein, latency can further be reduced by reducing neural network compute time. Such techniques may include quantization, low-rank matrix factorization, network sparsification, knowledge distillation, architectural changes (e.g., custom layer modifications), and/or dynamic compute allocation (e.g., using complex computations for complex frames and simple computations for simple frames). Such techniques may be used in combination with the techniques described herein to reduce model latency and provide low-latency neural network architecture.

Figure 9:
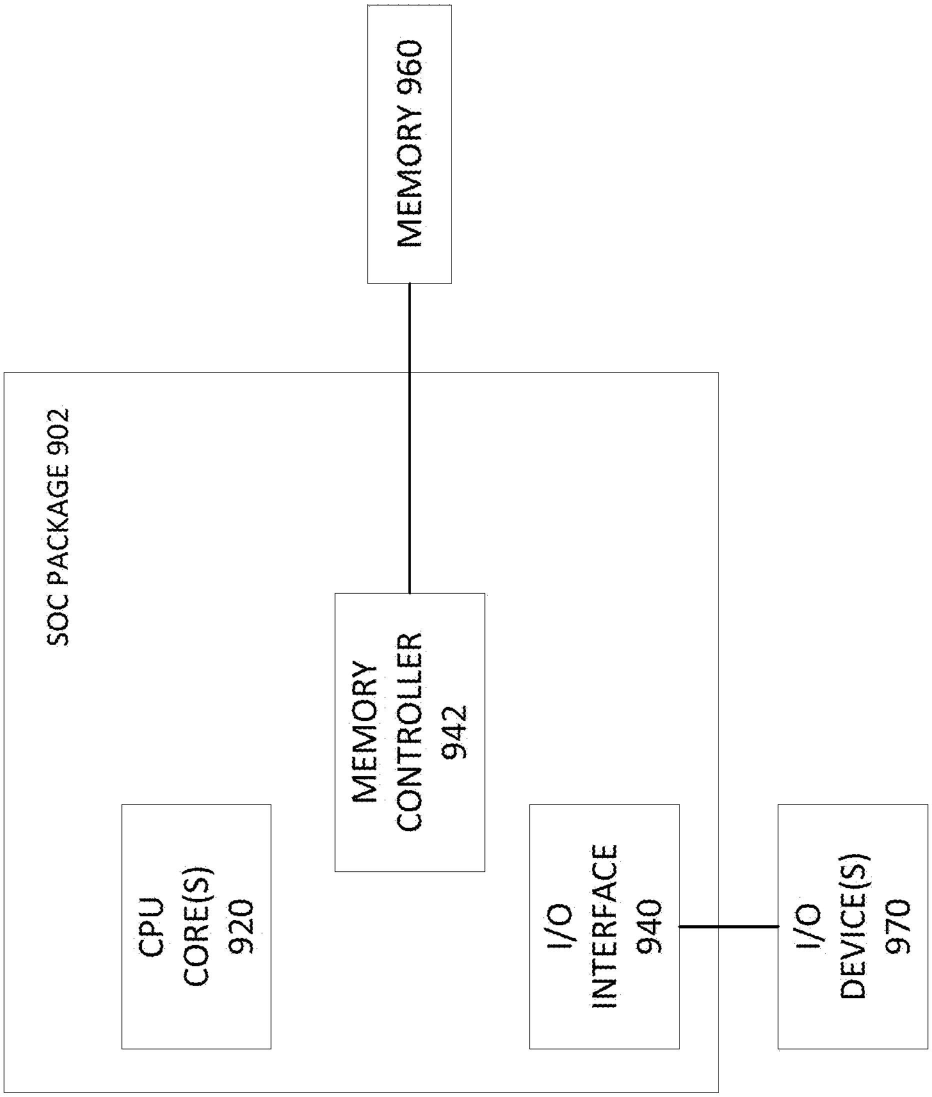
FIG. 9 illustrates a block diagram of a system-on-chip (SOC) package that may be implemented in an ear-worn device, according to a non-limiting embodiment of the present application.

FIG. 9 illustrates a block diagram of a system-on-chip (SOC) package that may be implemented in an ear-worn device, according to a non-limiting embodiment of the present application. In some embodiments, SOC package 902 may implement various operations in an ear-worn device, such as 102 (in FIG. 1), 202 (in FIG. 2), 300 (in FIG. 3A), 330 (in FIG. 3B), or a circuitry of an ear-worn device such as 400 (in FIG. 4). In various embodiments, SOC 902 includes one or more Central Processing Unit (CPU) cores 920, an Input/Output (I/O) interface 940, and a memory controller 942. Various components of the SOC package 902 may be optionally coupled to an interconnect or bus such as discussed herein with reference to the other figures. Also, the SOC package 902 may include components such as those discussed with reference to the ear-worn device described in FIGS. 1-8C. Further, each component of the SOC package 920 may include one or more other components of the ear-worn device, e.g., as discussed with reference to FIGS. 3A-4. In one embodiment, SOC package 902 (and its components) is provided on one or more Integrated Circuit (IC) die, e.g., which are packaged into a single semiconductor device. The single semiconductor device may be configured to be used as an ear-worn device, an amplification system or a hearing device to be used in the human ear canal.

As illustrated in FIG. 9, SOC package 902 is coupled to a memory 960 via the memory controller 942. In an embodiment, the memory 960 (or a portion of it) can be integrated on the SOC package 902. The I/O interface 940 may be coupled to one or more I/O devices 970, e.g., via an interconnect and/or bus such as discussed herein. I/O device(s) 970 may include interfaces to communicate with SOC 902. In an exemplary embodiment, I/O interface 940 communicates wirelessly with I/O device 970. SOC package

902 may comprise hardware, software and logic to implement, for example, the various components or methods described in FIGS. 1-8C. The implementation may be communicated with an auxiliary device, e.g., I/O device 970. I/O device 970 may comprise additional communication capabilities, e.g., cellular, BlueTooth, WiFi or other protocols, to access any component in the ear-worn device.

Figure 10:
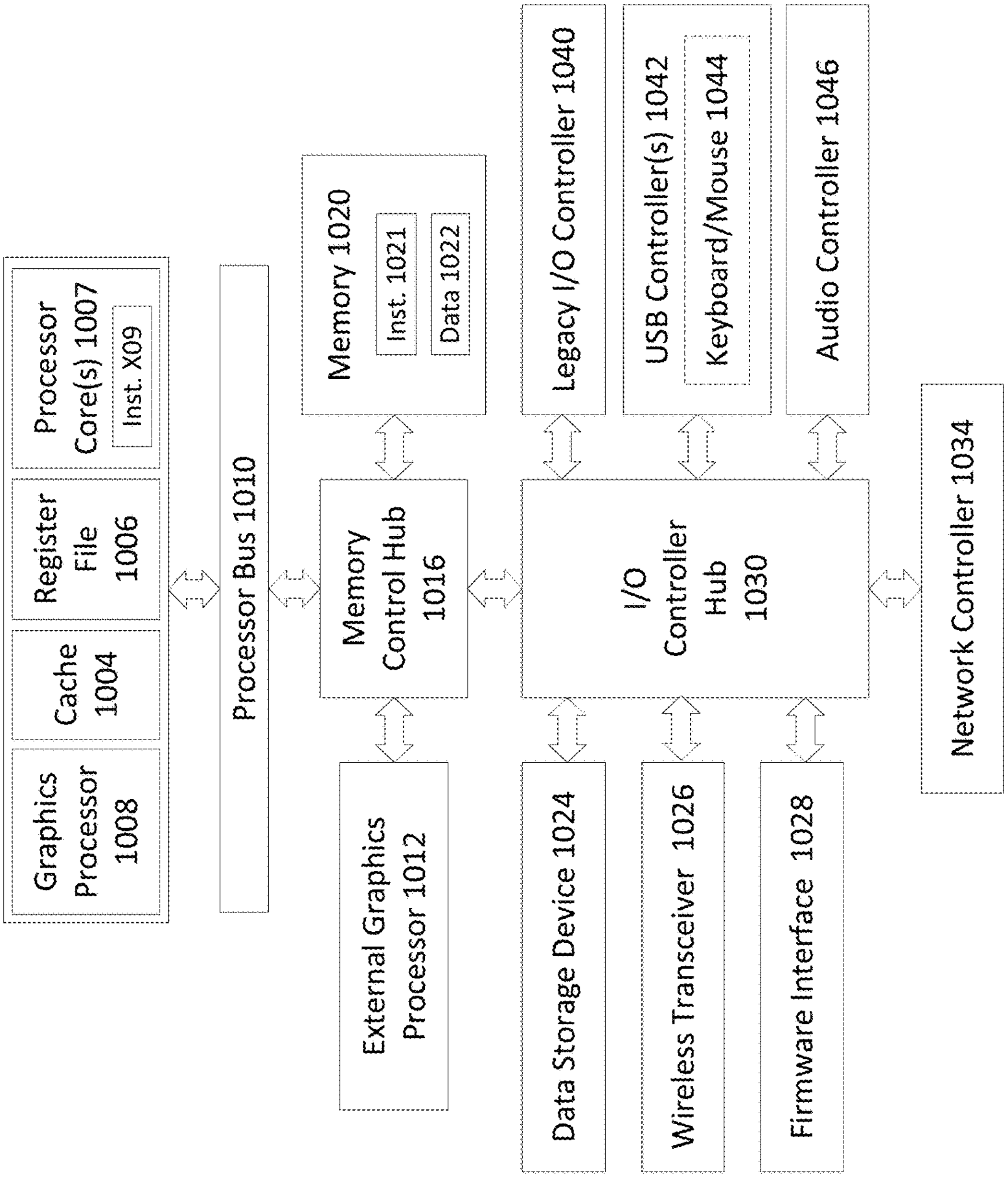
FIG. 10 illustrates an example of a computing system that may be implemented in an electronic device to implement various embodiments described in the present application.

FIG. 10 illustrates an example of a computing system that may be implemented in an electronic device to implement various embodiments described in the present application. In some embodiments, system 1000 may implement operations described in various embodiments with reference to FIGS. 1-2, such as 110 (in FIG. 1) or 204 (in FIG. 2). In some embodiments, the system 1000 includes one or more processors 1002 and one or more graphics processors 1008, and may be a single processor desktop system, a multiprocessor workstation system, or a server system having a large number of processors 1002 or processor cores 1007. In on embodiment, the system 1000 is a processing platform incorporated within a system-on-a-chip (SoC or SOC) integrated circuit for use in mobile, handheld, or embedded devices.

An embodiment of system 1000 can include or be incorporated within a server-based smart-device platform or an online server with access to the internet. In some embodiments system 1000 is a mobile phone, smart phone, tablet computing device or mobile Internet device. Data processing system 1000 can also include, couple with, or be integrated within a wearable device, such as a smart watch wearable device, smart eyewear device (e.g., face-worn glasses), augmented reality device, or virtual reality device. In some embodiments, data processing system 1000 is a television or set top box device having one or more processors 1002 and a graphical interface generated by one or more graphics processors 1008.

In some embodiments, the one or more processors 1002 each include one or more processor cores 1007 to process instructions which, when executed, perform operations for system and user software. In some embodiments, each of the one or more processor cores 1007 is configured to process a specific instruction set 1009. In some embodiments, instruction set 1009 may facilitate Complex Instruction Set Computing (CISC), Reduced Instruction Set Computing (RISC), or computing via a Very Long Instruction Word (VLIW). Multiple processor cores 1007 may each process a different instruction set 1009, which may include instructions to facilitate the emulation of other instruction sets. Processor core 1007 may also include other processing devices, such as a DSP.

In some embodiments, the processor 1002 includes cache memory 1004. Depending on the architecture, the processor 1002 can have a single internal cache or multiple levels of internal cache. In some embodiments, the cache memory is shared among various components of the processor 1002. In some embodiments, the processor 1002 also uses an external cache (e.g., a Level-3 (L3) cache or Last Level Cache (LLC)) (not shown), which may be shared among processor cores 1007 using known cache coherency techniques. A register file 1006 is additionally included in processor 1002 which may include different types of registers for storing different types of data (e.g., integer registers, floating point registers, status registers, and an instruction pointer register). Some registers may be general-purpose registers, while other registers may be specific to the design of the processor 1002.

In some embodiments, processor 1002 is coupled to a processor bus 1010 to transmit communication signals such as address, data, or control signals between processor 1002 and other components in system 1000. In one embodiment the system 1000 uses an exemplary 'hub' system architecture, including a memory controller hub 1016 and an Input Output (I/O) controller hub 1030. A memory controller hub 1016 facilitates communication between a memory device and other components of system 1000, while an I/O Controller Hub (ICH) 1030 provides connections to I/O devices via a local I/O bus. In one embodiment, the logic of the memory controller hub 1016 is integrated within the processor.

Memory device 1020 can be a dynamic random-access memory (DRAM) device, a static random access memory (SRAM) device, flash memory device, phase-change memory device, or some other memory device having suitable performance to serve as process memory. In one embodiment the memory device 1020 can operate as system memory for the system 1000, to store data 1022 and instructions 1021 for use when the one or more processors 1002 executes an application or process. Memory controller hub 1016 also couples with an optional external graphics processor 1012, which may communicate with the one or more graphics processors 1008 in processors 1002 to perform graphics and media operations.

In some embodiments, ICH 1030 enables peripherals to connect to memory device 1020 and processor 1002 via a high-speed I/O bus. The I/O peripherals include, but are not limited to, an audio controller 1046, a firmware interface 1028, a wireless transceiver 1026 (e.g., Wi-Fi, Bluetooth), a data storage device 1024 (e.g., hard disk drive, flash memory, etc.), and a legacy I/O controller 1040 for coupling legacy (e.g., Personal System 2 (PS/2)) devices to the system. One or more Universal Serial Bus (USB) controllers 1042 connect input devices, such as keyboard and mouse 1044 combinations. A network controller 1034 may also couple to ICH 1030. In some embodiments, a high-performance network controller (not shown) couples to processor bus 1010. It will be appreciated that the system 1000 shown is exemplary and not limiting, as other types of data processing systems that are differently configured may also be used. For example, the I/O controller hub 1030 may be integrated within the one or more processor 1002, or the memory controller hub 1016 and I/O controller hub 1030 may be integrated into a discreet external graphics processor, such as the external graphics processor 1012.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or." as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

What is claimed is:

1. A method for enhancing audio signals with a hearing aid, the hearing aid comprising a microphone, a processing circuit coupled to the microphone, and an output signal generator coupled to the processing circuit, the method comprising:

detecting an audio signal with the microphone of the hearing aid;

as the audio signal is being detected, dividing, with the processing circuit of the hearing aid, the audio signal into a plurality of overlapping segments, the plurality of overlapping segments comprising a first segment and a second segment, the first segment and the second segment sharing an overlapping portion;

after detecting the first segment, enhancing the overlapping portion by processing the first segment with a neural network engine (NNE) of the processing circuit to obtain a first output for enhancing the first segment including the overlapping portion;

transmitting the enhanced overlapping portion to the output signal generator for playback;

beginning playback of the enhanced overlapping portion with the output signal generator;

detecting the second segment during the playback of the enhanced overlapping portion;

after detecting the second segment including the overlapping portion and a non-overlapping portion, enhancing the non-overlapping portion of the second segment by processing the second segment with the NNE to obtain a second output for enhancing the second segment including the overlapping portion and the non-overlapping portion;

transmitting the enhanced non-overlapping portion to the output signal generator for playback; and beginning playback of the enhanced non-overlapping portion with the output signal generator.

2. The method of claim 1, wherein enhancing the overlapping portion comprises enhancing the overlapping portion with a digital signal processing (DSP) circuit of the processing circuit of the hearing aid.

3. The method of claim 1, wherein processing the first segment with the NNE of the processing circuit to obtain the first output comprises isolating a first speech component of the overlapping portion from a first noise component of the overlapping portion, and wherein processing the second segment with the NNE comprises isolating a second speech component of the overlapping portion from a second noise component of the overlapping portion.

4. The method of claim 1, wherein enhancing the overlapping portion by processing the first segment with the NNE to obtain the first output for enhancing the first segment comprises:

generating a mask for the first segment including the overlapping portion;

applying the mask to the first segment to generate an enhanced first segment including the enhanced overlapping portion and an enhanced non-overlapping portion; and excluding the enhanced non-overlapping portion from further processing.

5. The method of claim 1, wherein a first length of the first segment is longer than the overlapping portion, and wherein a second length of the second segment is longer than the overlapping portion.

6. The method of claim 1, wherein the plurality of overlapping segments further comprises a third segment, the third segment and the second segment sharing a second overlapping portion, the second overlapping portion comprising the non-overlapping portion of the second segment, and wherein the method further comprises:

detecting the third segment during the playback of the enhanced non-overlapping portion of the second segment;

after detecting the third segment including the second overlapping portion and a non-overlapping portion, enhancing the non-overlapping portion of the third segment by processing the third segment with the NNE to obtain a third output for enhancing the third segment including the non-overlapping portion;

transmitting the enhanced non-overlapping portion of the third segment to the output signal generator for playback; and beginning playback of the enhanced non-overlapping portion of the third segment with the output signal generator.

7. The method of claim 1, wherein the plurality of overlapping segments further comprises a third segment, the method further comprising:

selectively transmitting, with a controller of the processing circuit of the hearing aid, the third segment to the NNE or a digital signal processing (DSP) circuit based on a characteristic of the third segment.

8. The method of claim 7, wherein a character of the third segment comprises a noise level of the third segment compared to a threshold noise level, and wherein selectively transmitting the third segment to the NNE or the DSP circuit based on the characteristic of the third segment comprises transmitting the third segment to the DSP circuit when the noise level is below the threshold noise level.

9. The method of claim 1, wherein the NNE comprises a recurrent NNE.

10. A method for enhancing audio signals with a hearing aid, the hearing aid comprising a microphone, a processing circuit coupled to the microphone, and an output signal generator coupled to the processing circuit, the method comprising:

detecting an audio signal with the microphone of the hearing aid;

as the audio signal is being detected, dividing, with the processing circuit of the hearing aid, the audio signal into a plurality of segments, the plurality of segments comprising a first segment and a second segment, the first segment preceding the second segment in time;

after detecting the first segment, processing the first segment with a neural network engine (NNE) to obtain a first output for enhancing the second segment;

enhancing the second segment based on the first output of the NNE;

transmitting the enhanced second segment to an output signal generator for playback; and beginning playback of the enhanced second segment with the output signal generator.

11. The method of claim 10, wherein dividing the detected audio signal into the plurality of segments comprises dividing the detected audio signal using a controller of the processing circuit, and wherein enhancing the second segment with the processing circuit of the hearing aid further comprises:

receiving, at a digital signal processing (DSP) circuit, the second segment from the controller, the receiving beginning at an initial time, wherein enhancing the second segment based on the first output of the NNE comprises enhancing the second segment with the DSP circuit of the processing circuit.

12. The method of claim 11, wherein enhancing the second segment with the DSP circuit comprises enhancing the second segment with the DSP circuit after an elapsed time since the initial time, the elapsed being equivalent to a length of the second segment.

13. The method of claim 11, wherein enhancing the second segment with the DSP circuit comprises enhancing the second segment with the DSP circuit after an elapsed time since the initial time, the elapsed time being equal to or shorter than a duration of processing the first segment with the NNE to obtain the first output for enhancing the detected audio signal.

14. The method of claim 10, wherein the plurality of segments further comprises a third segment, the first segment and the second segment preceding the third segment in time, the method further comprising:

after detecting the second segment, processing the second segment with the NNE to obtain a second output for enhancing the third segment; and enhancing the third segment based on the second output of the NNE.

15. The method of claim 10, wherein the plurality of segments further comprises a third segment, the first segment and the second segment preceding the third segment in time, the method further comprising:

prior to completing the processing of the second segment with the NNE, detecting the third segment;

enhancing the third segment based on the first output of the NNE; and transmitting the enhanced third segment to the output signal generator for playback.

16. The method of claim 10, wherein processing the first segment with the NNE to obtain the first output for enhancing the second segment comprises generating, based on the first segment, a mask for the second segment, and wherein enhancing the second segment based on the first output of the NNE comprise applying the generated mask to the second segment.

17. The method of claim 10, wherein the NNE comprises a recurrent NNE.

18. The method of claim 10, wherein detecting the first segment comprises detecting the first segment during a first time period, and wherein detecting the second segment comprises detecting the second segment beginning at a time after the first time period.

* * * * *